US007280736B2

(12) United States Patent
Sangawa et al.

(10) Patent No.: US 7,280,736 B2
(45) Date of Patent: Oct. 9, 2007

(54) PHOTONIC CRYSTAL DEVICE

(75) Inventors: Ushio Sangawa, Ikoma (JP); Tomoyasu Fujishima, Neyagawa (JP); Hiroshi Kanno, Osaka (JP); Kazuyuki Sakiyama, Shijonawate (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/250,390

(22) Filed: Oct. 17, 2005

(65) Prior Publication Data

US 2006/0045460 A1 Mar. 2, 2006

Related U.S. Application Data

(63) Continuation of application No. PCT/JP2005/007014, filed on Apr. 11, 2005.

(30) Foreign Application Priority Data

Apr. 21, 2004 (JP) ............................ 2004-125195

(51) Int. Cl.
*G02B 6/00* (2006.01)

(52) U.S. Cl. ...................... 385/147; 385/129; 385/130; 385/131

(58) Field of Classification Search ................. 385/147
See application file for complete search history.

(56) References Cited

U.S. PATENT DOCUMENTS 5,990,850 A * 11/1999 Brown et al. ............... 343/912
6,274,293 B1 * 8/2001 Gupta et al. ................ 430/315
6,611,085 B1 * 8/2003 Gee et al. ................... 313/271
6,809,856 B2 * 10/2004 Reed et al. ................. 359/326
7,155,087 B2 * 12/2006 Suh et al. ..................... 385/27

(Continued)

FOREIGN PATENT DOCUMENTS

JP 2-118599 9/1990

(Continued)

OTHER PUBLICATIONS

Joannopoulos, J.D., et al. "Photonic Crystals: Molding the Flow of Light" Princeton University Press, 1995, Chapter 4, pp. 38-42, translated by Hisataka Fujii and Mitsuteru Inoue, pp. 42, Fig 4-1, 1st printing of 1st Edition, Corona Publishing Co., Ltd, Reference cited in [0004], p. 2 of the specification.

*Primary Examiner*—Jennifer Doan
(74) *Attorney, Agent, or Firm*—McDermott Will & Emery LLP

(57) ABSTRACT

A photonic crystal device according to the present invention includes: a first dielectric substrate 104 having a first lattice structure, of which the dielectric constant changes periodically within a first plane; a second dielectric substrate 105 having a second lattice structure, of which the dielectric constant changes periodically within a second plane; and an adjustment device (pivot 303) for changing a photonic band structure, defined by the first and second lattice structures, by varying relative arrangement of the first and second lattice structures. The first and second dielectric substrates 104 and 105 are stacked one upon the other.

17 Claims, 28 Drawing Sheets

U.S. PATENT DOCUMENTS

| | | | | |
|---|---|---|---|---|
| 2003/0091258 | A1 | 5/2003 | Uesaka et al. | |
| 2003/0186139 | A1 | 10/2003 | Nagao | |
| 2004/0022481 | A1 | 2/2004 | Schroeder | |
| 2005/0029536 | A1* | 2/2005 | Sugitatsu et al. | 257/103 |
| 2005/0110138 | A1* | 5/2005 | Dutta | 257/735 |
| 2005/0238310 | A1* | 10/2005 | Hoshi et al. | 385/129 |
| 2005/0264874 | A1* | 12/2005 | Lin | 359/359 |

FOREIGN PATENT DOCUMENTS

| | | | |
|---|---|---|---|
| JP | 7-154101 | A | 6/1995 |
| JP | 2000-341031 | A | 12/2000 |
| JP | 2004-004433 | | 1/2004 |

* cited by examiner (22.5° , 22.5° )

(45° , 45° )

(67.5° , 67.5° )

PHOTONIC CRYSTAL DEVICE

This Application is a continuation of International Application No. PCT/JP2005/007014, whose international filing date is Apr. 11, 2005 which in turn claims the benefit of Japanese Patent Application No. 2004-125195, filed on Apr. 21, 2004, the disclosures of which Applications are incorporated by reference herein. The benefit of the filing and priority dates of the International and Japanese Applications is respectfully requested.

BACKGROUND OF THE INVENTION

1. Field of the Invention

The present invention relates to a photonic crystal device with a variable photonic crystal structure.

2. Description of the Related Art

Various types of photonic crystals, having a one-, two- or three-dimensional lattice, have been reported. A photonic crystal having the simplest structure is formed by alternately stacking two types of dielectric thin films with mutually different dielectric constants one upon the other.

The structure of the one-dimensional photonic crystal disclosed in John D. Joannopoulos, Robert D. Meade and Joshua N. Winn, "Photonic Crystals: Molding the Flow of Light", translated by Hisataka Fujii and Mitsuteru Inoue, 1st printing of 1st edition, published by Corona Publishing Co., Ltd. on Oct. 23, 2000 (ISBN 4-339-00727-7), p. 42, FIG. 4-1 will be described with reference to FIG. 28. The one-dimensional photonic crystal 1201 shown in FIG. 28 includes low-dielectric-constant layers 1202 and high-dielectric-constant layers 1203 that are stacked alternately. The low-dielectric-constant layers 1202 and high-dielectric-constant layers 1203 are made of dielectric materials that transmit an electromagnetic wave 1204.

In the example illustrated in FIG. 28, the unit cell (with a lattice constant a) of the photonic crystal is formed by a pair of low- and high-dielectric-constant layers 1202 and 1203. A number of such unit cells are arranged in the z-axis direction, thereby defining a one-dimensional periodic structure.

Hereinafter, it will be described how the one-dimensional photonic crystal 1201 works.

If the electromagnetic wave 1204 that has propagated in the z-axis direction is incident perpendicularly onto the lower surface of the one-dimensional photonic crystal 1201, the electromagnetic wave 1204 may be unable to transmit through the one-dimensional photonic crystal 1201 depending on its frequency. Such a frequency range in which the electromagnetic wave 1204 is forbidden to transmit (i.e., a forbidden frequency band) is called a "photonic band gap (PBG)". The PBG has a similar property to that of the electron's band gap of a normal crystal, and depends on the lattice structure of the photonic crystal. In the one-dimensional photonic crystal 1201, the PBG frequency band changes with the dielectric constants of the low- and high-dielectric constant layers 1202 and 1203 and the magnitude of the lattice constant a.

The PBG is present for the following reason.

In the one-dimensional photonic crystal 1201, the incoming electromagnetic wave 1204 is partially reflected from every interface between the low- and high-dielectric-constant layers 1202 and 1203, thereby producing a reflected wave. There are a lot of interfaces in the one-dimensional photonic crystal 1201, thus producing a number of reflected waves. If the wavelength of the electromagnetic wave 1204 matches the lattice constant a and if the reflected waves are in phase with each other and superposed one upon the other, then those reflected waves will interfere with each other and intensify each other without attenuating. In that case, if there are a good number of unit cells in the propagation direction of the electromagnetic wave 1204, then the incoming electromagnetic wave 1204 will be reflected substantially totally. More specifically, when a phase difference between a wave reflected from an interface and a wave reflected from another interface that is adjacent to the former interface is an integral multiple of $\pm 2\pi$, all of those electromagnetic waves 1204 reflected from the respective interfaces will intensify each other. As a result, an intense reflected wave will be produced by the photonic crystal 1201 as a whole.

If a sufficiently large number of unit cells are arranged, then the photonic crystal 1201 will produce zero transmitted waves because it is a passive circuit and due to the energy conservation law. Consequently, the PBG is produced.

This feature of the photonic crystal is used in not just the field of optics but also various other fields of application. In the field of radio frequency communications, for example, this feature is taken advantage of to improve the radiation characteristic of an antenna and to reduce crosstalk between transmission lines.

It was proposed that the characteristic of a microstrip antenna, including a conductor pattern on a dielectric substrate, be improved by using the photonic crystal. A conventional microstrip antenna has considerable directivity for electric fields that are parallel to its dielectric substrate and for E-plane (which is defined for a linearly polarized antenna as a plane containing the electric field vector and direction of maximum radiation). Accordingly, electromagnetic waves radiated from the microstrip antenna with such directivity are easily coupled to surface wave modes having the capability of propagating on the dielectric substrate. Thus, unwanted leakage of electrical power, not contributing to radiation, is likely to occur to produce diffracted waves at the edges of the dielectric substrate. As a result, the directivity of the antenna is disturbed, which is a problem.

To overcome such a problem, it is effective to arrange the photonic crystals around the antenna. If the PBG is matched with the operating frequency of the antenna, then no electromagnetic waves could propagate parallel to the surface of the dielectric substrate. As a result, such leakage of electrical power, not contributing to radiation, can be reduced significantly.

However, the conventional photonic crystal cannot change its lattice constant a dynamically, i.e., cannot change the frequency of appearance of the PBG as required.

In order to overcome the problems described above, a primary object of the present invention is to provide a photonic crystal device that can easily change the frequency range in which the PBG appears.

SUMMARY OF THE INVENTION

A photonic crystal device according to the present invention includes: a first dielectric substrate having a first lattice structure, of which the dielectric constant changes periodically within a first plane; a second dielectric substrate having a second lattice structure, of which the dielectric constant changes periodically within a second plane; and an adjustment device for changing a photonic band structure, defined by the first and second lattice structures, by varying relative arrangement of the first and second lattice structures. The first and second dielectric substrates are stacked one upon the other.

In one preferred embodiment, the photonic crystal device further includes a third dielectric substrate, which is arranged so as to face at least one of the first and second dielectric substrates.

In this particular preferred embodiment, the third dielectric substrate includes a dielectric layer and a conductor pattern supported on the dielectric layer.

In that case, the photonic crystal device further includes a grounded conductor layer, and at least one of the first and second dielectric substrates is located between the third dielectric substrate and the grounded conductor layer.

In a specific preferred embodiment, at least a portion of the conductor pattern functions as a microstrip line.

In an alternative preferred embodiment, at least a portion of the conductor pattern functions as a microstrip antenna.

In another preferred embodiment, the adjustment device rotates at least one of the first and second dielectric substrates.

In still another preferred embodiment, the adjustment device rotates the third dielectric substrate.

In yet another preferred embodiment, the dielectric substrate to be turned by the adjustment device has a disk shape.

In yet another preferred embodiment, the adjustment device includes a motor.

In yet another preferred embodiment, the first and second lattice structures are defined by conductor patterns that have been made on the first and second dielectric substrates, respectively.

In yet another preferred embodiment, the first and second lattice structures are defined by rugged patterns that have been made on the first and second dielectric substrates, respectively.

In yet another preferred embodiment, each of the first and second lattice structures is a one-dimensional lattice.

In yet another preferred embodiment, each of the first and second lattice structures is a combination of multiple one-dimensional lattices that are arranged in mutually different directions.

In yet another preferred embodiment, each of the first and second lattice structures includes a curved pattern within the plane thereof.

In yet another preferred embodiment, the first and second dielectric substrates have different lattice structures from one area of their planes to another.

In yet another preferred embodiment, at least one of the first and second dielectric substrates has a conductor line for propagating an electromagnetic wave.

The photonic crystal device of the present invention can change the relative arrangement of at least two dielectric substrates with lattice structures, and therefore, can control dynamically the photonic band structure that is defined by the combined lattice structures. As a result, the frequency band in which the photonic band structure appears can be changed freely.

DETAILED DESCRIPTION OF PREFERRED EMBODIMENTS

Figure 1:
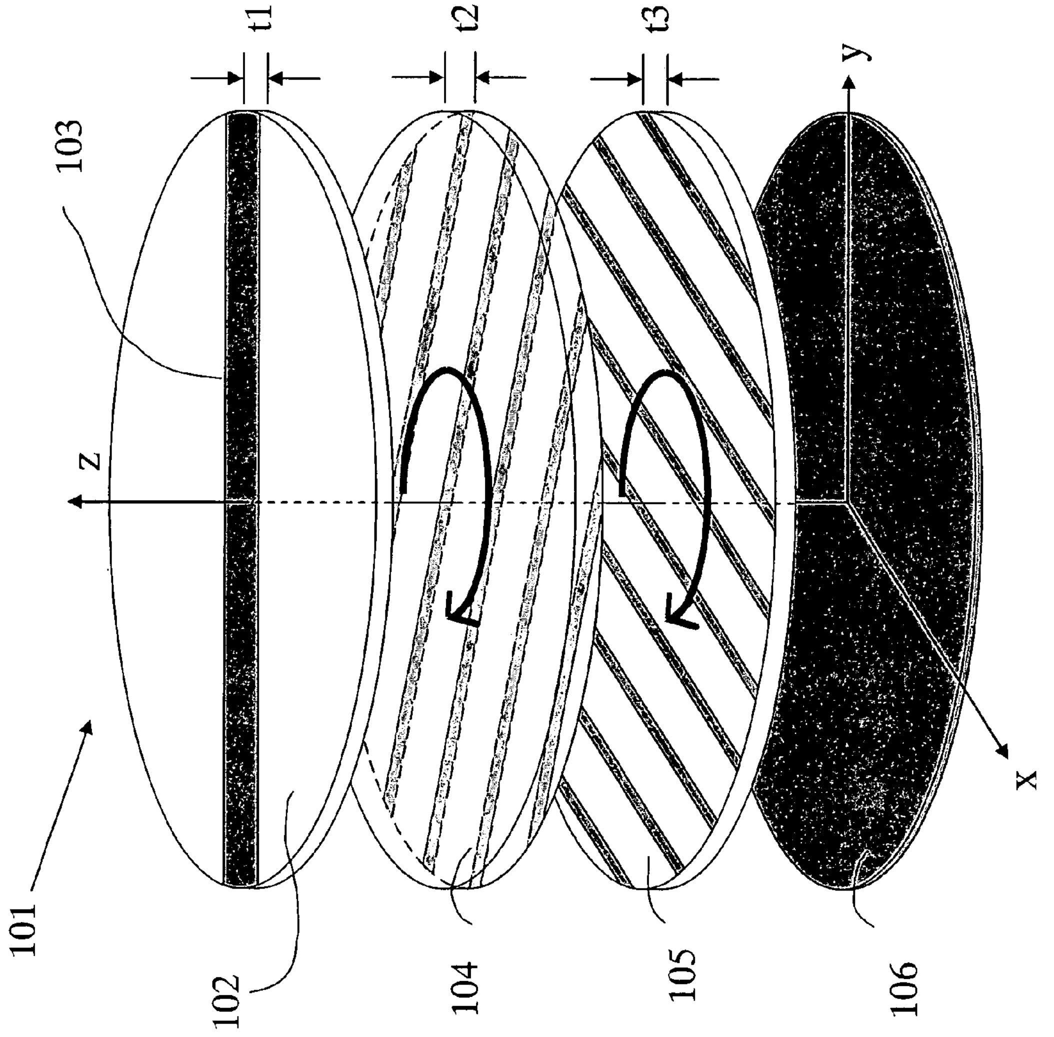
FIG. 1 is a perspective view illustrating a photonic crystal device according to a first preferred embodiment of the present invention.

A photonic crystal device according to the present invention includes a first dielectric substrate having a first lattice structure, of which the dielectric constant changes periodically within a first plane, and a second dielectric substrate having a second lattice structure, of which the dielectric constant changes periodically within a second plane.

According to the present invention, a photonic band structure can be defined by combining (or stacking) the first and second lattice structures and can be changed dynamically. More specifically, the photonic crystal device of the present invention includes an adjustment device that can change the relative arrangement of the first and second lattice structures stacked one upon the other. Thus, the photonic band structure can be changed by varying the relative arrangement of the first and second lattice structures.

In a preferred embodiment, at least one of the first and second dielectric substrates is rotatably arranged. The first and second dielectric substrates have one-dimensional or two-dimensional lattice structures defined by arranging conductor lines periodically on their surfaces, for example. However, these dielectric substrates may have any other periodic structure.

In the following description, the first and second dielectric substrates will sometimes be referred to as a "first lattice substrate" and a "second lattice substrate", respectively. As used herein, the "lattice substrate" broadly refers to any substrate of which the effective dielectric constant changes periodically parallel to its substrate. This period is defined by the operating frequency of the photonic crystal device of the present invention. More specifically, the period is a design parameter determined by various equations (to be described later) according to the situation where the photonic crystal device is used. This period is set to be at most equal to a half of the effective propagation wavelength of an electromagnetic wave that passes the photonic crystal device at the upper limit of the operating frequency.

It should be noted that a lattice substrate, of which the effective dielectric constant changes periodically in one direction that is parallel to the surface of the dielectric substrate, will be referred to herein as a "one-dimensional lattice substrate". In another lattice substrate, if the surface of a dielectric substrate is divided into a plurality of areas, the effective dielectric constant may change periodically in mutually different directions in those areas. Such a substrate will also be referred to herein as a "one-dimensional lattice substrate".

Hereinafter, preferred embodiments of a photonic crystal device according to the present invention will be described with reference to the accompanying drawings.

Embodiment 1

A first preferred embodiment of a photonic crystal device according to the present invention will be described with reference to FIG. 1, which is a perspective view illustrating a schematic configuration of the photonic crystal device 101 of the first preferred embodiment.

The photonic crystal device 101 has a structure in which four plate members or layered members (which will be referred to herein as "plate members") are stacked one upon the other. In this case, the four plate members are a circuit substrate (with a thickness t1) 102, a first lattice substrate (with a thickness t2) 104, a second lattice substrate (with a thickness t3) 105, and a grounded plate 106. In FIG. 1, these plate members are illustrated as if they were spaced wide apart from each other. Actually, however, these members are arranged close to, or even in contact with, each other.

The circuit substrate 102 includes a dielectric base (dielectric layer) and a linear conductor line 103 provided on the upper surface of the base. Each of the first and second lattice substrates 104 and 105 includes a dielectric base (dielectric layer) and a one-dimensional lattice provided on one side thereof. The grounded plate 106 may be made of a conductive material such as a metal.

The thicknesses t1, t2 and t3 of the circuit substrate 102, first lattice substrate 104 and second lattice substrate 105 are determined so as to satisfy the following Equation (1):

$$t1+t2+t3 \ll h_{max}=6.74\ \tan^{-1}\epsilon_r/(f\{\epsilon_r-1\}^{1/2}) \quad (1)$$

where f [GHz] is the upper limit of the operating frequency of the photonic crystal device of the present invention and $\epsilon_r$ is the average dielectric constant of the respective substrates.

The upper limits of t1, t2 and t3 are determined by Equation (1) but the lower limits thereof are defined by the mechanical strength. This is because if the dielectric base became too thin, then the mechanical strength of the substrate would decrease significantly.

The respective dielectric bases of the circuit substrate 102 and first and second lattice substrates 104 and 105 are preferably made of a dielectric material that has a low dielectric loss at the operating frequency to minimize the dissipation of energy caused by the dielectric loss. If a radio frequency signal, of which the frequency belongs to the millimeter wave band, is processed by the photonic crystal device of this preferred embodiment, the dielectric material of the substrates 102, 104 and 105 is preferably selected from the group consisting of a fluorine resin, alumina ceramic, fused quartz, sapphire, high-resistance silicon and GaAs. To minimize the leakage of electrical power of electromagnetic waves in a parallel plate mode that will occur on the respective surfaces of the substrates 102, 104 and 105, the dielectric bases of the substrates 102, 104 and 105 to be stacked preferably have the same dielectric and magnetic constants.

The conductor line 103 of the circuit substrate 102 functions as a microstrip line that uses the grounded plate 106 as the ground. The photonic crystal device shown in FIG. 1 receives an RF signal through one end of the conductor line 103 and outputs it through the other end of the conductor line 103.

Suppose uniform dielectric layers (with thicknesses t2 and t3, respectively) are inserted in place of the first and second lattice substrates 104 and 105 between the circuit substrate 102 and the grounded plate 106. In that case, this device will operate just like a microstrip line in which the conductor line 103 is located on the upper surface of a single dielectric substrate with a thickness of t1+t2+t3 and in which the grounded plate 106 is attached to the lower surface thereof.

Meanwhile, in the photonic crystal device 101 of this preferred embodiment, the dielectric portion of the microstrip line has a photonic crystal and the band structure of the photonic crystal can be varied and controlled by changing the relative arrangement of the first and second lattice substrates 104 and 105 as will be described later.

Generally speaking, a microstrip line can transmit signals falling within a broad frequency range and does not exhibit particularly high wavelength selectivity. However, the energy of an electromagnetic field, which is generated when an RF signal is propagating through a microstrip line, is confined mainly in the dielectric layer that is sandwiched between the conductor line 103 and the grounded plate 106. Accordingly, if the photonic crystal structure is present in the dielectric portion, then the propagation state of the signal being transmitted through the conductor line 103 can be changed significantly. By making use of this phenomenon, the function of blocking the propagation of an RF signal falling within a particular wavelength range can be added.

Both of the first and second lattice substrates 104 and 105 shown in FIG. 1 have a disk shape of the same size and can turn around an axis that passes the respective centers of the substrates (which axis will be referred to herein as a "z-axis"). The first and second lattice substrates 104 and 105 are both parallel to an xy plane that is perpendicular to the z-axis.

In this preferred embodiment, each of the first and second lattice substrates 104 and 105 has a one-dimensional lattice structure, in which striped conductor lines are arranged periodically. Thus, if one of the first and second lattice substrates 104 and 105 is turned around the z-axis, then the angle formed by the two sets of striped conductor lines can be changed into any arbitrary value. In the example illustrated in FIG. 1, the surface of the first lattice substrate 104 on which the one-dimensional lattice structure is provided (i.e., its lower surface) is opposed to the surface of the second lattice substrate 105 on which the one-dimensional lattice structure is provided (i.e., its upper surface).

Figure 2:
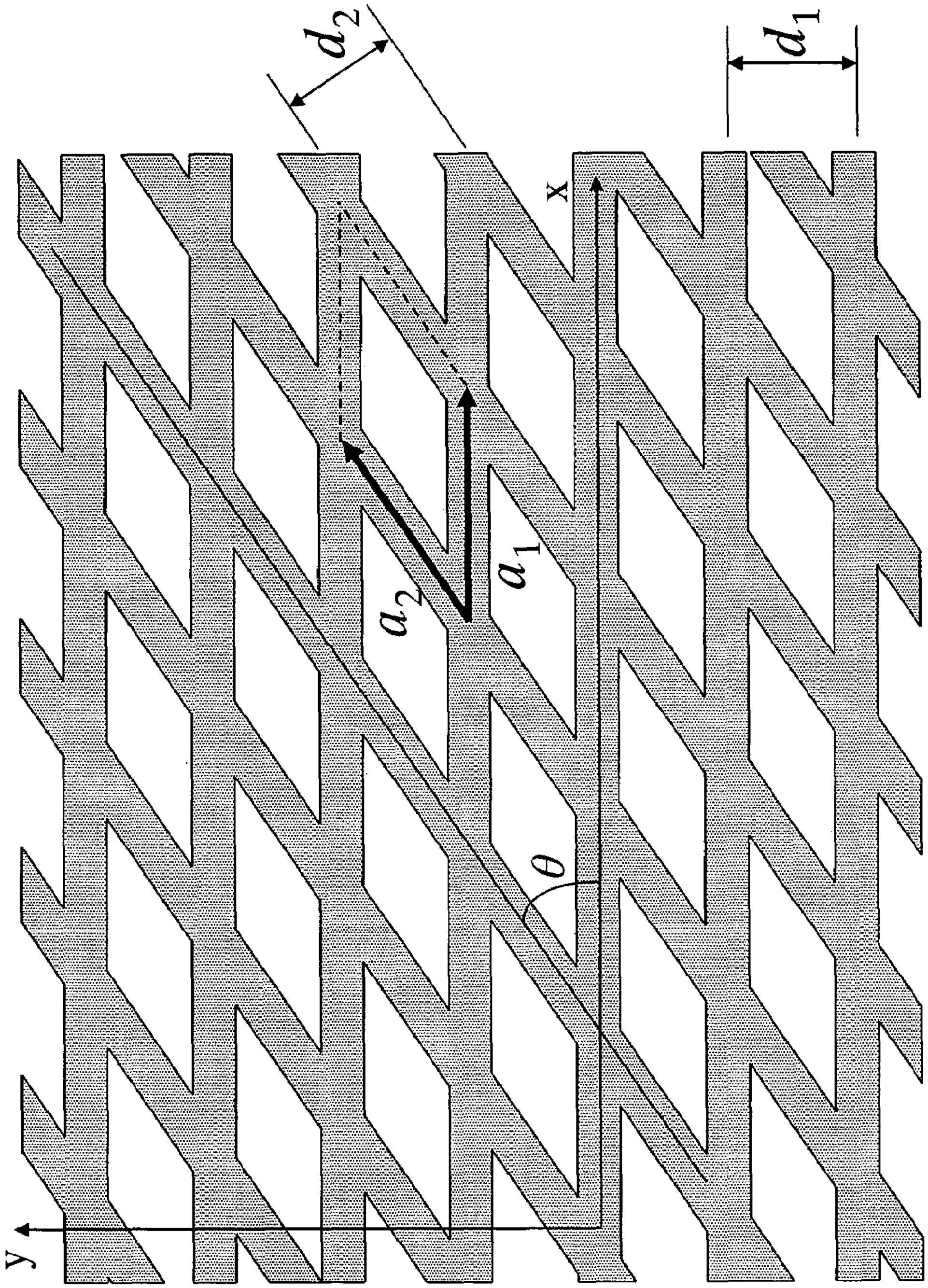
FIG. 2 is a plan view illustrating a lattice pattern of the photonic crystal device of the first preferred embodiment.

FIG. 2 illustrates a combined lattice pattern formed by the first and second lattice substrates 104 and 105 and is a plan view in which that lattice pattern is projected onto the xy plane. In FIG. 2, the lattice gap of the first lattice substrate 104 is identified by d1 and the lattice gap of the second lattice substrate 105 is identified by d2. Also, in FIG. 2, the angle θ is formed by two striped conductor lines that cross each other.

As shown in FIG. 2, when the two one-dimensional lattices cross each other, two-dimensional moiré fringes are formed. In FIG. 2, the arrangement period and arrangement direction of the intersections between the two lattice patterns (which will be referred to herein as "lattice points") depend on the lattice gaps d1 and d2 and the angle θ.

In an orthogonal coordinate system fixed on the first lattice substrate 104, respective lattice vectors a1 and a2 are given by:

$$a1=(d2/\sin\theta,\ 0)$$

$$a2=(d1/\tan\theta,\ d1)$$

The magnitudes |a1| and |a2| of the respective lattice vectors are given by:

$$|a1|=d2/\sin\theta$$

$$|a2|=d1/\sin\theta$$

The lattice pattern shown in FIG. 2 corresponds to a two-dimensional orthorhombic lattice with the lattice constants |a1| and |a2|.

If there is an interaction between the lattice points of a photonic crystal and an electromagnetic field, then the distribution of a magnetic field is represented as a Bloch function due to the translational symmetry of the photonic crystal. And its wave vector has translational symmetry, of which the units are reciprocal vectors corresponding to a1 and a2, in the reciprocal space.

The ratio of the wave vector of an RF signal, propagating through a microstrip line on a uniform dielectric substrate, to the wave vector of an electromagnetic wave propagating through a free space at the same frequency never has heavy frequency dependence unless the dielectric substrate exhibits its frequency dependence. However, if the photonic crystal lattice structure is provided in the dielectric substrate, then the translational symmetry of the wave vector generates. As a result, the wave vector ratio will have heavy frequency dependence and direction dependence. In addition, if scattered waves are produced by respective lattice points due to an interaction between the lattice points and the electromagnetic field propagating through the microstrip line and satisfy the in-phase resonance condition (i.e., the Bragg reflection condition), then a non-propagating frequency band, in which no electromagnetic wave can propagate at the wave vector, i.e., the photonic band gap (PBG), is produced.

The PBG frequency range changes with the magnitude of the interaction between the electromagnetic field generated by the RF signal propagating through the microstrip line and the lattice points (unit cells). The greater the magnitude of this interaction and the higher the intensity of the scattered waves, the broader the frequency range in which the PBG is produced becomes.

The PBG frequency range also depends on the translational symmetry of the reciprocal space. And the symmetry is determined by the lattice structure. For that reason, by changing the lattice structure, the PBG can be changed. As described above, the lattice structure can be changed by varying the relative arrangement of the first and second lattice substrates 104 and 105 (typically, by adjusting the angle θ).

In this preferred embodiment, the photonic crystal structure is formed by combining the two layers of lattice structures at mutually different levels with each other. However, the two layers of lattice structures do not have to be in contact with each other. That is to say, the gap g between the two lattice planes may be changed arbitrarily as long as the gap g satisfies the following inequality (2):

$$0 \leqq g \leqq h_{max}-(t1+t2+t3) \quad (2)$$

The gap g may be set as follows. First, the upper limit $h_{max}$ of the overall thickness of the substrates is estimated by the right side of Equation (1). Next, t1, t2 and t3 are determined by the mechanical strength required. Finally, since the upper limit of g is determined by the right side of Inequality (2), appropriate g can be determined. For example, suppose alumina substrates are used to process an RF signal with a frequency of about 30 GHz.

In that case, since $h_{max}$≈1.1 mm, the upper limit of (t1+t2+t3) is set to 600 μm. Considering the required mechanical strength of the alumina substrates, t1, t2 and t3 should all be at least equal to 150 μm. That is why the gap between the two lattice planes (at the intersections) is set within the range of 0 mm to 150 μm (=600 μm−150 μm×3).

Exemplary Configuration for Lattice Substrate

Figure 3:
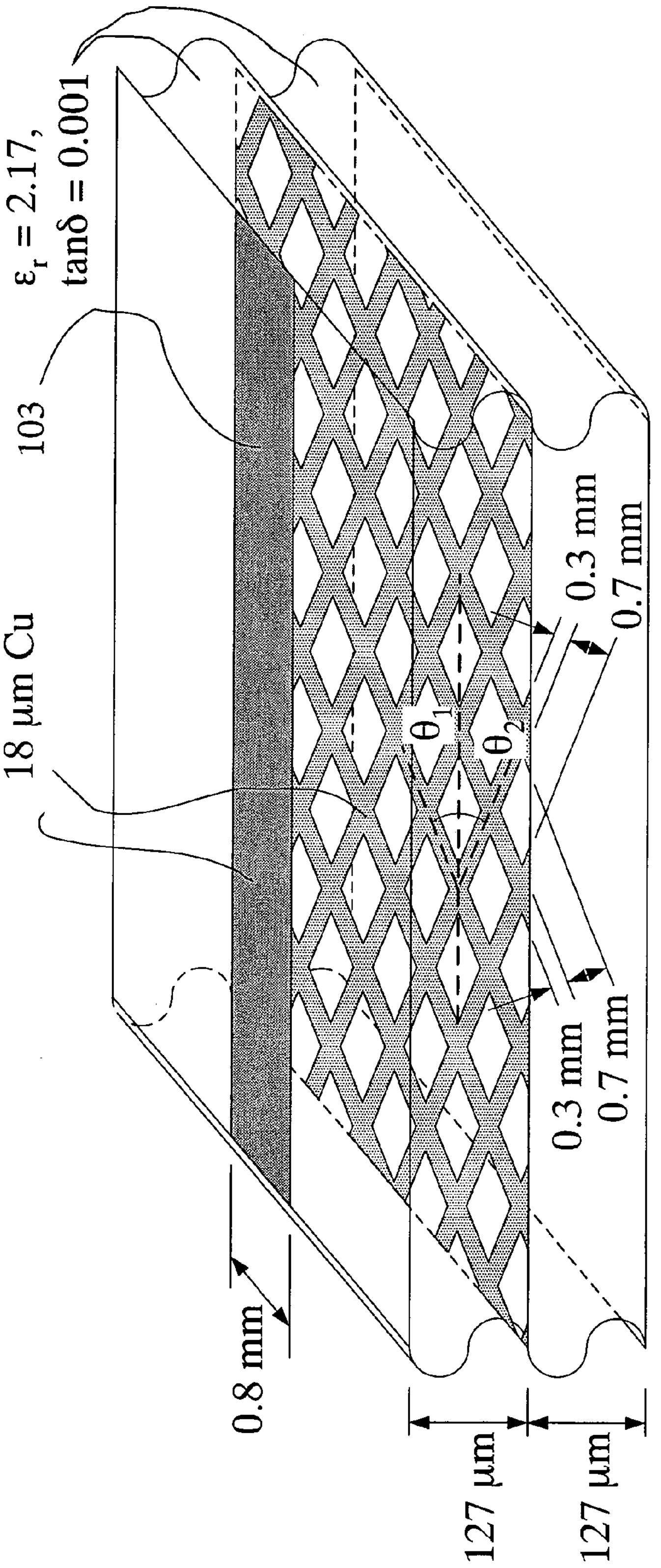
FIG. 3 schematically illustrates a specific structure of the photonic crystal device of the first preferred embodiment.

Next, the lattice substrates that form the photonic crystal structure will be described with reference to FIG. 3.

The dielectric substrates for use in this preferred embodiment are made of a dielectric material with a relative dielectric constant of 2.17 and a dielectric loss tangent of 0.001. The overall thickness (t1+t2+t3) of the dielectric layers in the microstrip line is set to be 127 μm+127 μm. The thickness of 127 μm of the upper layer is the sum of the thickness t1 of the circuit substrate 102 and the thickness t2 of the first lattice substrate 104, while the thickness of 127 μm of the lower layer is equal to the thickness t3 of the second lattice substrate 105. In FIG. 3, the illustration of the grounded plate is omitted and the thickness of the lattice pattern is neglected for the sake of simplicity.

Both the lattice substrates 104 and 105 have a lattice line width (i.e., the width of the conductor line) of 0.3 mm and lattice constants d1 and d2 of 1 mm (=the stripe width of 0.3 mm+the lattice gap of 0.7 mm). On the other hand, the width of the conductor line 103 on the circuit substrate 102 is set to be 0.8 mm such that the conductor line 103 functions as a microstrip line with a characteristic impedance of 50 Ω. All of these conductor lines can be formed by patterning copper foil with a thickness of 18 μm by a photomechanical process.

Suppose the angle formed between the length direction of the conductor line 103 and the lattice direction of the first lattice substrate 104 is identified by θ1 and the angle formed between the length direction of the conductor line 103 and the lattice direction of the second lattice substrate 105 is identified by θ2. In that case, the lattice pattern can be defined by a combination of these two angles (θ1, θ2).

Figure 4C:
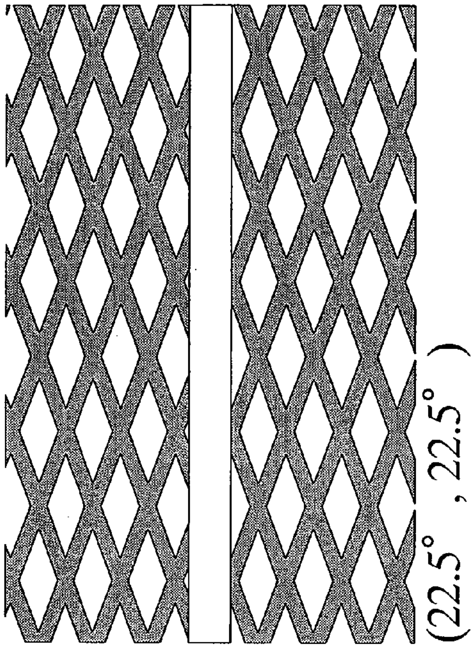
FIGS. 4A, 4B and 4C are plan views showing the lattice patterns of the photonic crystal device of the first preferred embodiment in situations where (θ1, θ2)=(45°, 45°), (θ1, θ2)=(67.5°, 67.5°) and (θ1, θ2)=(22.5°, 22.5°), respectively.
Figure 4A:
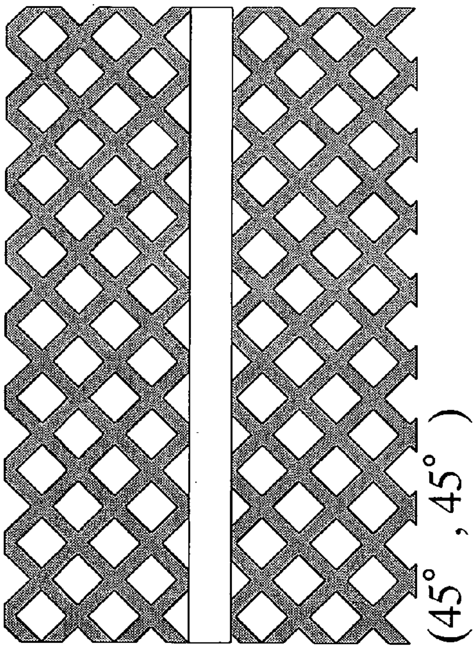
Figure 4B:
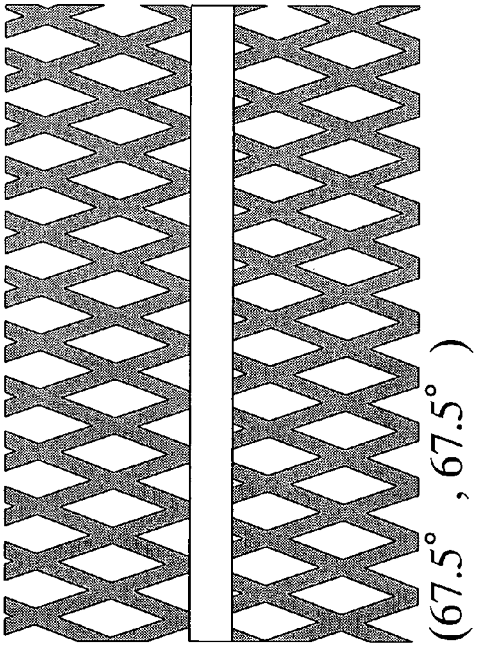

FIGS. 4A, 4B and 4C show lattice patterns in which (θ1, θ2)=(45°, 45°), (θ1, θ2)=(67.5°, 67.5°) and (θ1, θ2)=(22.5°, 22.5°), respectively.

The properties of the photonic crystals in the arrangements shown in FIGS. 4A, 4B and 4C were evaluated by electromagnetic field analysis, which was carried out by using an electromagnetic field analysis simulator IE 3D Release 10 produced by Zeland Software Inc. As an analysis model, a substrate structure having the dimensions shown in FIG. 3 (with planar sizes of 5 mm×10 mm) was used. The mesh division number needed to carry out the calculations was set to be twenty per wavelength. In this case, one wavelength is equal to the wavelength (of about 3.4 mm) of an electromagnetic wave that propagates at a frequency of 50 GHz through a space filled with the same dielectric material as that of the dielectric substrate.

Figure 5:
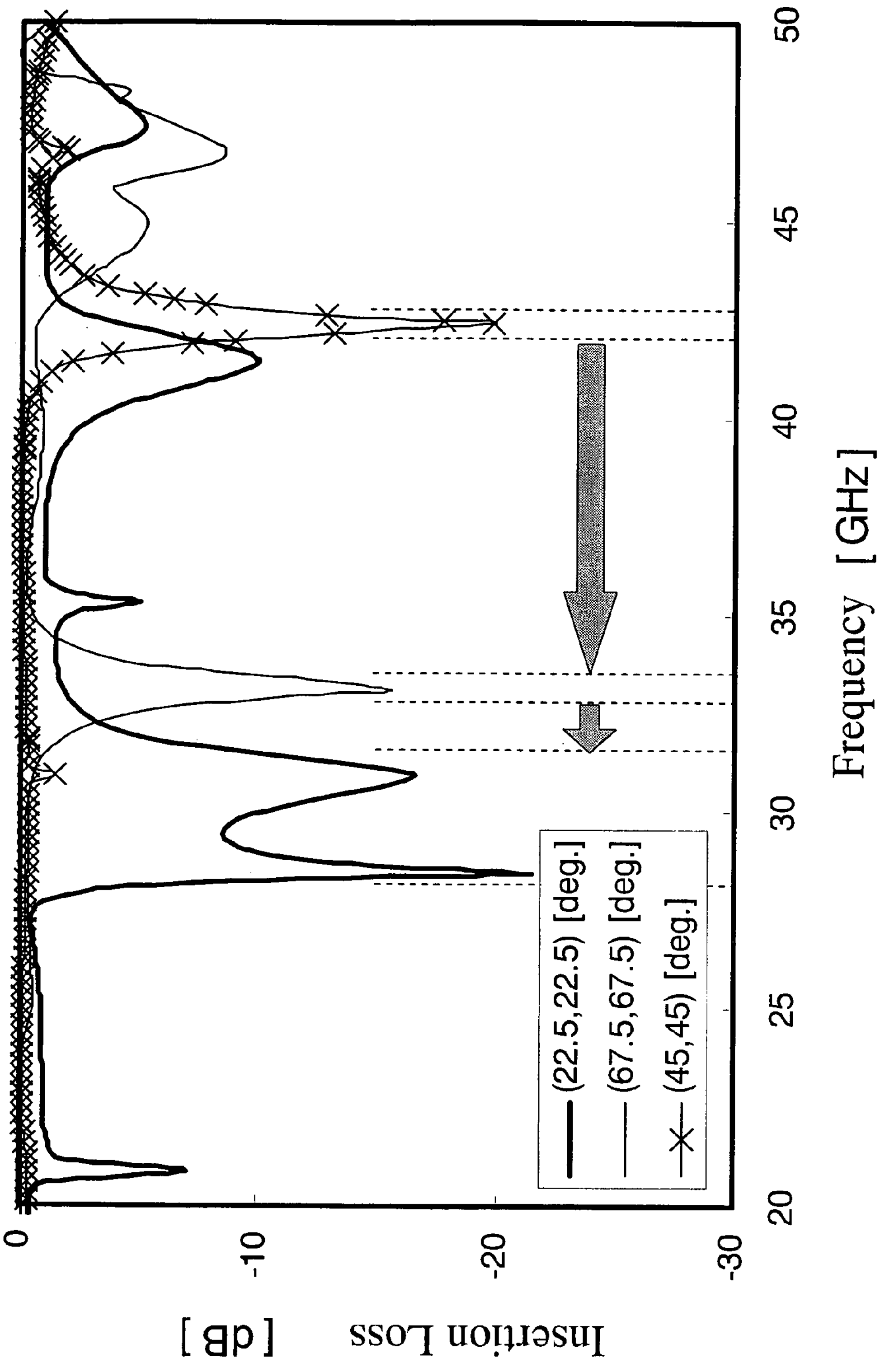
FIG. 5 is a graph showing how the insertion loss, caused by the lattice pattern shown in FIG. 3 on an RF signal, changes with the frequency.

FIG. 5 is a graph showing how the insertion loss of the conductor line 103 in the photonic crystal device, including the lattice pattern shown in FIG. 4A, 4B or 4C, changes with the frequency.

As can be seen easily from FIG. 5, there is a frequency range, in which the insertion loss is relatively high and which changes with the lattice pattern adopted. That frequency range with such a high insertion loss corresponds to the PBG.

As shown in FIG. 5, the PBG in a situation where (θ1, θ2)=(67.5°, 67.5°) shifted to a lower frequency range than the PBG in a situation where (θ1, θ2)=(45°, 45°). Also, the PBG in a situation where (θ1, θ2)=(22.5°, 22.5°) shifted to a lower frequency range than the PBG in the situation where (θ1, θ2)=(67.5°, 67.5°).

This means that the lattice gap of the photonic crystal as sensed by an RF signal propagating through the conductor line 103 increases in the order of (θ1, θ2)=(45°, 45°)→(67.5°, 67.5°)→(22.5°, 22.5°). The PBG has a frequency, at which the lattice gap of the photonic crystal corresponds to a half wavelength of the RF signal, at the center.

Comparing the lattice pattern shown in FIG. 4B to that shown in FIG. 4C, it can be seen that the lattice pattern in which (θ1, θ2)=(67.5°, 67.5°) and the lattice pattern in which (θ1, θ2)=(22.5°, 22.5°) form the same photonic crystal except that the lattice directions are different. As shown in FIG. 5, however, their PBGs appear in quite different frequency ranges.

In general, the number of waves in a crystal also depends heavily on the propagation direction of the waves in a reciprocal space. In this case, the direction of the conductor line 103 with respect to the lattice determines the propagation direction of the waves (i.e., the RF signal), thus making the different mentioned above. That is why even after the relative arrangement of the first lattice substrate and the lower one-dimensional lattice substrate has been fixed, the PBG can also be changed dynamically and adaptively by varying the direction of the conductor line 103 with respect to these substrates.

It should be noted that the first and second lattice substrates 104 and 105 do not have to be in contact with each other. Optionally, an additional dielectric layer may be present between the lower surface of the first lattice substrate 104 and the upper surface of the second lattice substrate 105.

In the example illustrated in FIG. 1, the lattice pattern of the first lattice substrate 104 is defined on the lower surface of the dielectric base. Alternatively, this lattice pattern may be defined on the upper surface of the dielectric base or even on both of the upper and lower surfaces thereof. Also, the grounded plate 106 does not have to be a part that can be separated from the second lattice substrate 105. Optionally, the grounded plate 106 may be fixed on the lower surface of the second lattice substrate 105.

Alternative Configurations for Lattice Substrates

Figure 6:
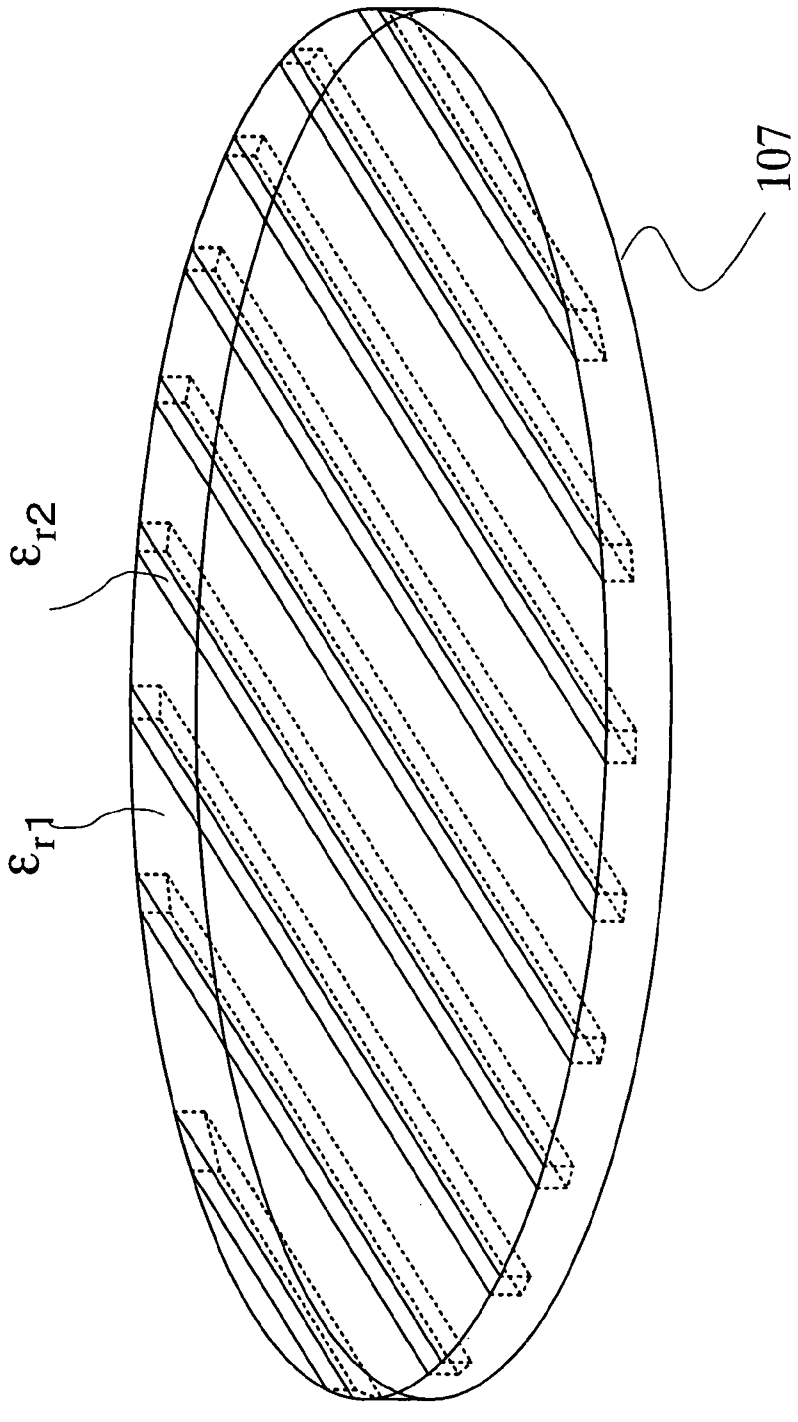
FIG. 6 is a perspective view illustrating a one-dimensional lattice substrate according to the first preferred embodiment.
Figure 7:
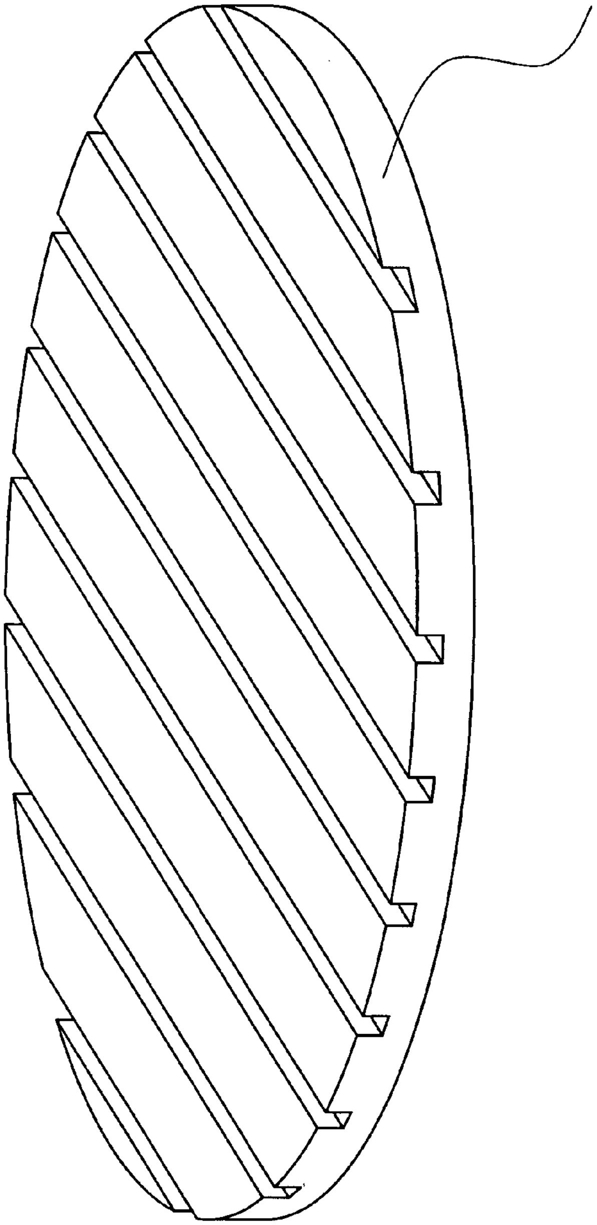
FIG. 7 is a perspective view illustrating another one-dimensional lattice substrate according to the first preferred embodiment.

FIG. 6 illustrates another exemplary lattice substrate that can be used in the photonic crystal device of the present invention. This one-dimensional lattice substrate has a periodic dielectric constant modulating structure on its surface. Such a dielectric constant modulating structure is obtained by cutting striped grooves at regular intervals on the upper surface of a dielectric substrate 107 with a dielectric constant ϵ1 and then filling those grooves with a material with a dielectric constant ϵ2. FIG. 7 illustrates another exemplary lattice substrate in which the grooves of the dielectric substrate 107 are not filled.

Figure 8:
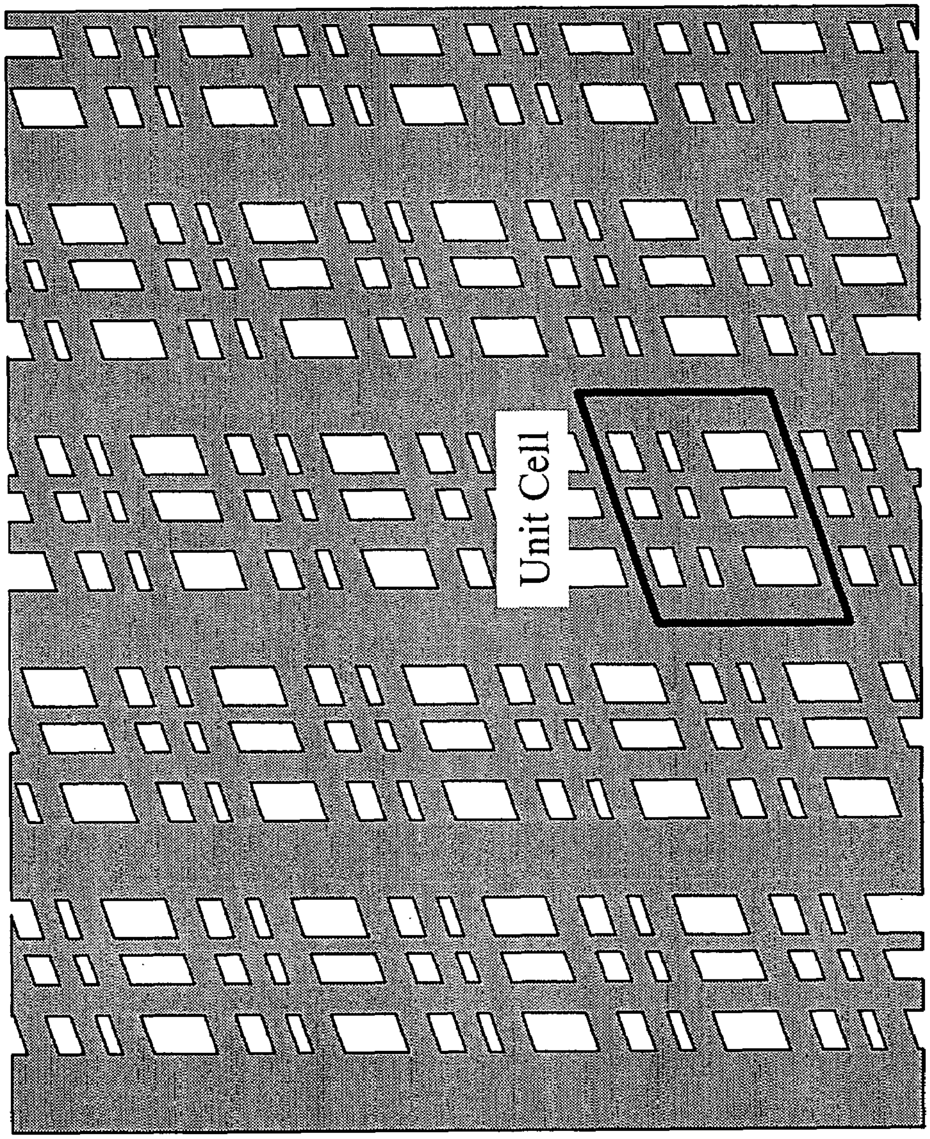
FIG. 8 is a plan view showing the fine structure of a two-dimensional lattice pattern that the photonic crystal device of the first preferred embodiment has.

FIG. 8 is a plan view illustrating another exemplary lattice pattern. This lattice pattern has not only the fundamental periodic arrangement but also a fine structure with an even higher spatial frequency. The lattice pattern shown in FIG. 8 is obtained by superposing the lattice patterns of the first and second lattice substrates 104 and 105 one upon the other.

The PBG frequency is determined by the lattice vector. That is why even if the lattice pattern has a fine structure, the frequency range in which the PBG appears does not change significantly unless the lattice vector changes. The distribution of atoms in a unit cell of an ordinary crystal determines the structure factor of a Laue spot in an XRD experiment. Likewise, by providing the fine structure for the photonic crystal, the "fine structure" can be changed in terms of the bandwidth of the PBG and the wave number in a frequency band in the vicinity of the PBG.

Figure 9:
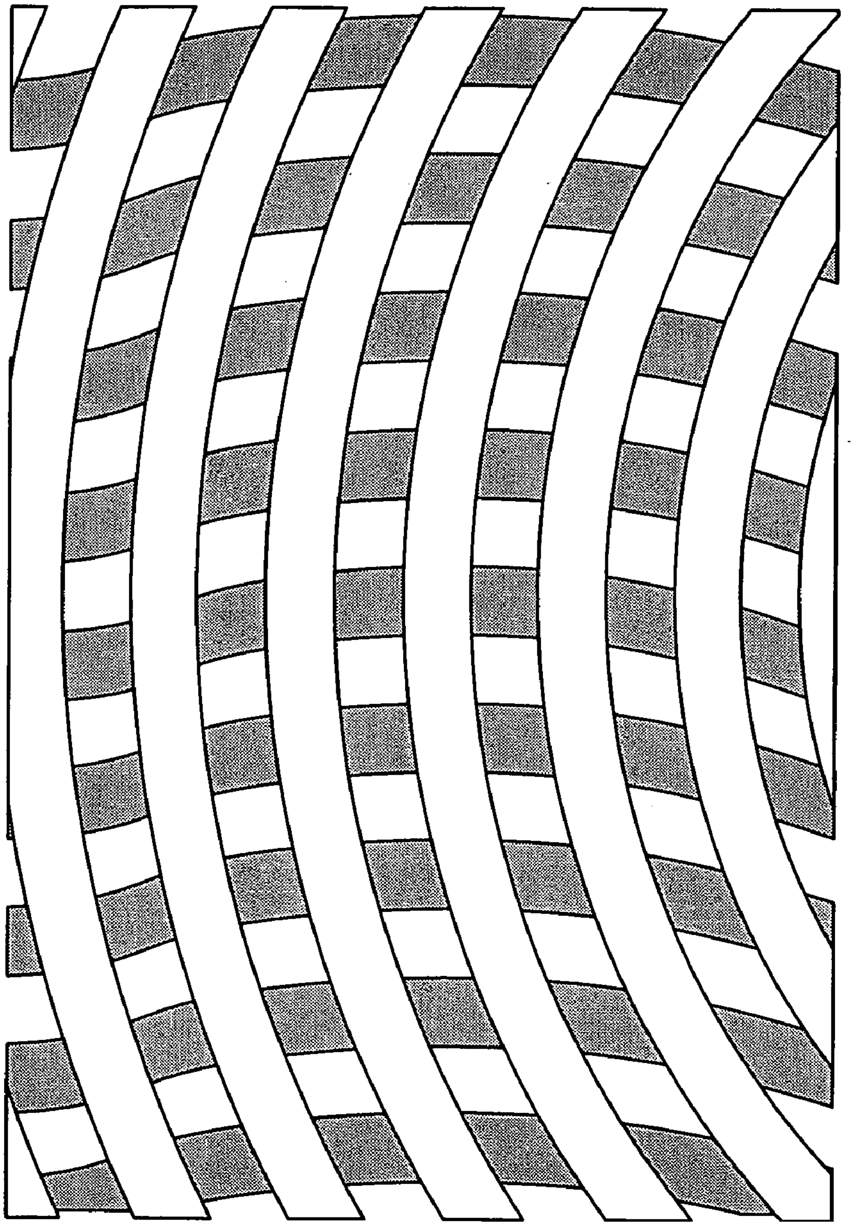
FIG. 9 is a plan view showing a two-dimensional lattice pattern of photonic crystals according to the first preferred embodiment.

FIG. 9 is a plan view illustrating yet another exemplary lattice pattern. This lattice pattern consists of periodic arrangements of curves. In this case, the symmetry of each lattice in the photonic crystal has some distribution within the plane of its associated dielectric substrate. For example, the PBG can be changed just as the actual crystal band structure changes with the strain applied to the crystal. A photonic crystal obtained by using dielectric substrates defining the lattice pattern shown in FIG. 9 has variables representing its state, which include not only the two lattice vectors but also the direction and location of the lattice strain distribution. The distribution and direction of the lattice strain can be controlled by not just "rotating" but also "shifting horizontally" the relative arrangement of the first and second lattice substrates 104 and 105.

Figure 10:
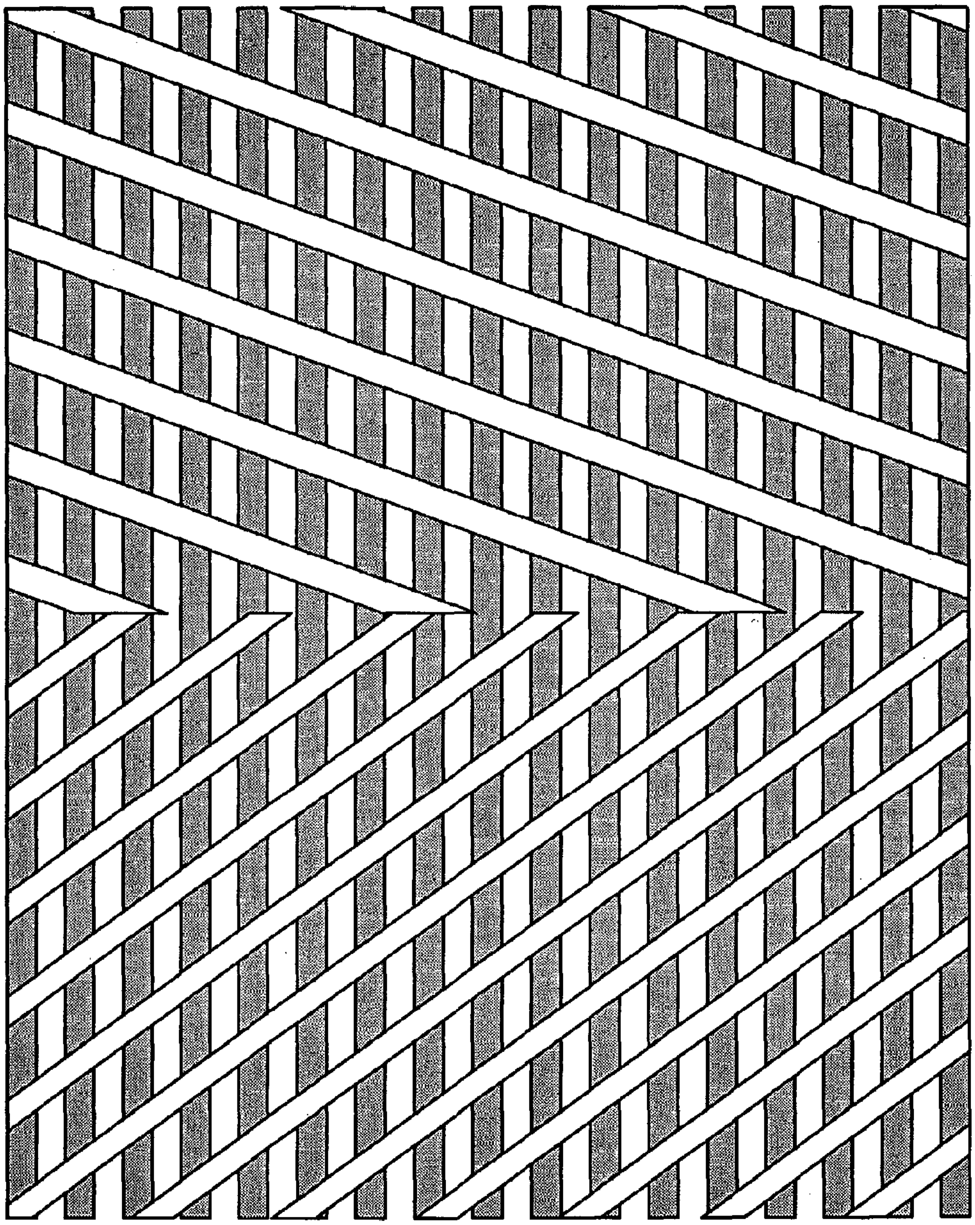
FIG. 10 is a plan view showing another two-dimensional lattice pattern of photonic crystals according to the first preferred embodiment.

FIG. 10 is a plan view illustrating yet another exemplary lattice pattern. This lattice pattern has a lattice structure that varies from one area to another. By using dielectric substrates having such a lattice structure, a "polycrystalline" photonic crystal can be obtained.

An oscillator and a frequency synthesizer need an RF circuit including devices that operate in multiple different frequency bands. In such an RF circuit, the circuit sections operating in those different frequency bands are preferably arranged in crystal regions that exhibit the PBG in their operating frequency ranges. In that case, the leakage of respective frequency components through the surface of the dielectric substrates can be avoided and high isolation characteristic is realized dynamically.

Embodiment 2

Figure 11:
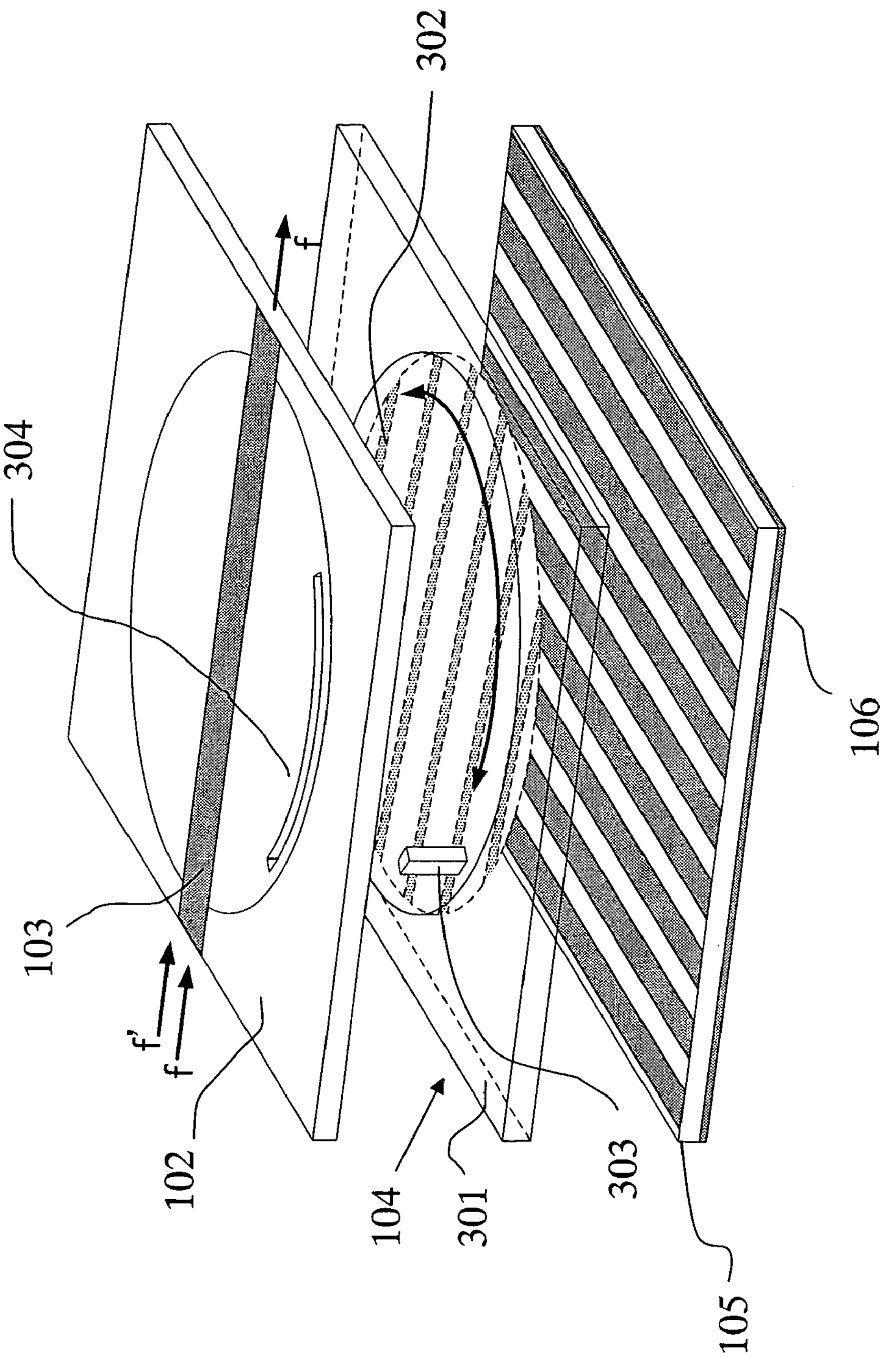
FIG. 11 is a perspective view illustrating a lattice turning mechanism according to a second preferred embodiment of the present invention.

Hereinafter, a second preferred embodiment of a photonic crystal device according to the present invention will be described with reference to FIG. 11. The photonic crystal device of this preferred embodiment includes an adjustment device (adjusting mechanism) for changing the angle θ shown in FIG. 2.

In this preferred embodiment, the rectangular second lattice substrate 105 and grounded plate 106 are bonded together and neither the substrate 105 and the plate 106 nor the circuit substrate 102 is movable. These members are fixed to a housing (not shown), while only the first lattice substrate 104 is rotatable.

The first lattice substrate 104 includes, as separate members, a dielectric substrate 301 with a circular opening and a disklike rotating lattice 302 arranged inside the opening of the dielectric substrate 301. The thickness of the dielectric substrate 301 is preferably equal to that of the rotating lattice 302. And the dielectric base portion of the rotating lattice 302 is preferably made of the same dielectric material as that of the dielectric substrate 301.

The inside diameter of the opening of the dielectric substrate 301 is slightly larger than the outside diameter of the rotating lattice 302 so as to make the rotating lattice 302 turn smoothly. The rotating lattice 302 has a pivot 303 on the upper surface thereof. A slot 304 is cut through the circuit substrate 102 to pass this pivot 303 through it. The groove width of the slot 304 is larger than the outside dimension of the pivot 303 and the shape of the slot 304 is defined such that the pivot 303 can move along a portion of the circumference as the rotating lattice 302 turns.

By pressing horizontally the pivot 303, of which the upper portion sticks out of the slot 304, either manually or by an external drive source, the pivot 303 can be slid along the inner walls of the slot 304. Then, as the pivot 303 moves, the rotating lattice 302 can be turned around the z-axis.

As the rotating lattice 302 is turned in this manner, the translational symmetry of the lattice pattern defined by the first and second lattice substrates 104 and 105 (see FIG. 2) changes. As a result, the structure of the photonic crystal formed by the first and second lattice substrates 104 and 105 changes dynamically. For example, if the rotating lattice 302 is turned with the pivot 303 when the insertion characteristic of the conductor line 103 is adjusted with respect to an RF signal, the frequency range in which the PBG appears can be shifted to any desired range.

In the photonic crystal device with such a configuration, when a signal with a frequency f and an unwanted signal with a frequency f' both enter the conductor line 103, the PBG appearance frequency can be adjusted to the latter frequency f' by turning the rotating lattice 302. By making such an adjustment, a signal can be output after its unnecessary components have been filtered out using the PBG.

A nonlinear element such as an oscillator is built in a communications device. However, the frequency and intensity of an unwanted signal generated by this nonlinear element will change from one product to another. That is why to guarantee accurate quality communications, each communications device being fabricated needs to be subjected to an adjustment for filtering out unnecessary signal components appropriately. The variation in characteristic between individual devices is particularly significant when those devices are designed to process an RF signal falling within the millimeter wave band, which is one of the factors that increase the manufacturing cost of a communications device operating in the millimeter wave band.

Figure 12:
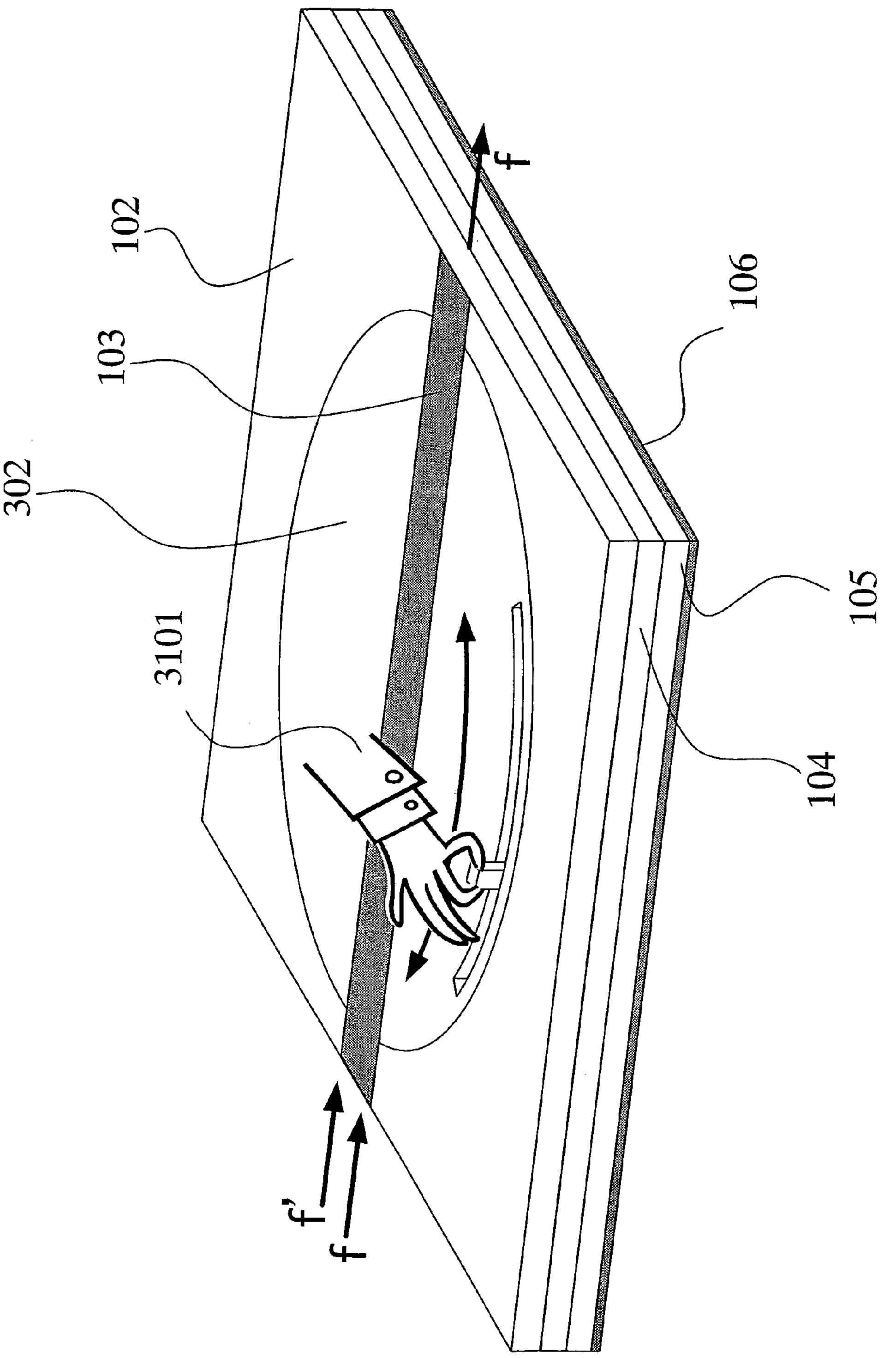
FIG. 12 is a perspective view illustrating how to turn or rotate a lattice manually (i.e., using a hand as a power source).

In contrast, by using the photonic crystal device of the present invention as a variable filter and inserting it into an RF circuit, the unnecessary signal components can be easily removed from mutually different frequency ranges for respective devices because the photonic crystal structure is variable. If the photonic crystal structure needs to be changed for the purpose of initial adjustment of a device being fabricated in this manner, then the rotating lattice 302 may be driven manually. FIG. 12 schematically illustrates how to turn the rotating lattice 302 by hand 3101.

Embodiment 3

Recently, a multimode terminal communications device for receiving and transmitting signals in multiple frequency bands by itself has been developed. In such a terminal, the appearance frequency of an unwanted signal generated in the circuit changes depending on the mode of operation. That is why the frequency band in which the PBG appears is preferably changed dynamically and adaptively according to the mode of operation. In that case, while an apparatus including the photonic crystal device of the present invention is operating, its photonic crystal structure needs to be changed dynamically. To do so, the rotating lattice 302 should not be driven manually but is preferably driven by using a drive element such as a motor.

Hereinafter, a third preferred embodiment of a photonic crystal device according to the present invention will be described with reference to FIG. 13, which illustrates an embodiment of a photonic crystal device including a rotating mechanism that uses a motor as a power source. The configuration of this preferred embodiment is the same as that of the photonic crystal device shown in FIG. 11 except the rotating mechanism. Thus, the following description will be focused on the rotating mechanism of this preferred embodiment.

Figure 13:
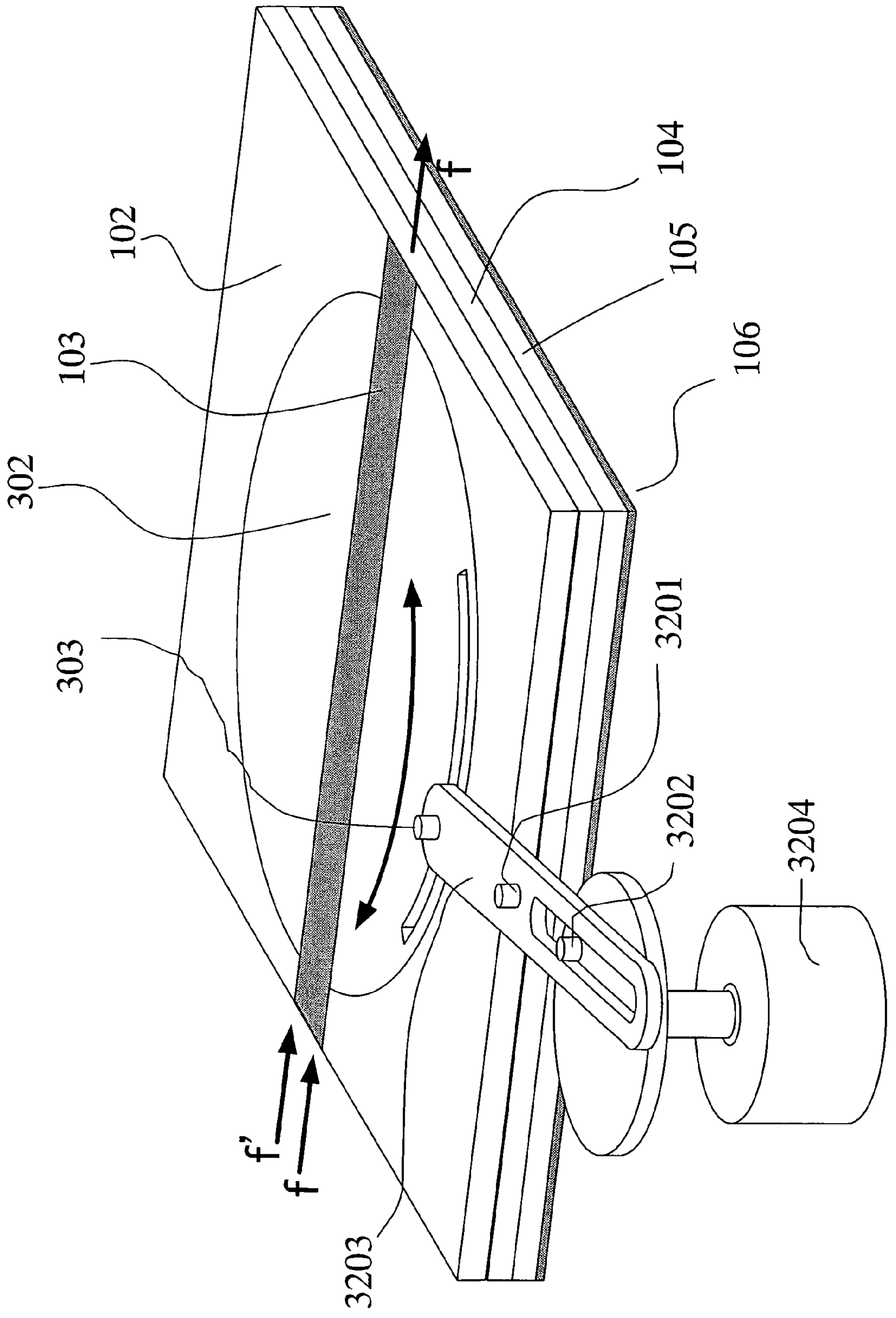
FIG. 13 is a perspective view illustrating a lattice turning mechanism according to a third preferred embodiment of the present invention.

In this preferred embodiment, a pivot 3202, which is eccentric with respect to the shaft of a motor 3204, is provided for the motor 3204 as shown in FIG. 13. The pivot 3202 is coupled to the other pivot 303 by way of a crank 3203. A fixed shaft 3201 is provided around the center of the crank 3203. When the motor 3204 is driven by a predetermined angle, the position of the pivot 3202 changes, thereby turning the crank 3203 on the fixed shaft 3201. As a result, the position of the pivot 303 also changes and the one-dimensional lattice substrate rotates. The precision of control of the lattice pattern rotation angle is determined by the precision of control of the pivot 303. The motor 3204 is preferably able to control the angle of rotation with high precision. A stepping motor such as a pulse motor can be used effectively as such a motor.

In this mechanism, the revolution per minute of the motor 3204 to have the pivot 303 make one reciprocating motion (which will be referred to herein as an "axle ratio") is one. Thus, the rotating lattice 302 shown in FIG. 11 can be positioned quickly.

Embodiment 4

Hereinafter, a fourth preferred embodiment of a photonic crystal device according to the present invention will be described with reference to FIG. 14, which illustrates another embodiment of a photonic crystal device including a rotating mechanism that uses a motor as a power source. The configuration of this preferred embodiment is also the same as that of the photonic crystal device shown in FIG. 11 except the rotating mechanism. Thus, the following description will be focused on the rotating mechanism of this preferred embodiment.

In this preferred embodiment, a small spur gear 3301 is connected to the motor 3204, while a large spur gear 3302 is secured to the rotating lattice 302 by way of the pivot 303. The big and small spur gears 3302 and 3301 engage with each other.

In such a mechanism, the rotational motion of the motor 3204 is converted into that of the rotating lattice 302 by way of the large spur gear 3302. To control the angle of rotation of the rotating lattice 302 more precisely, a stepping motor is preferably used as the motor 3204.

Embodiment 5

Figure 15:
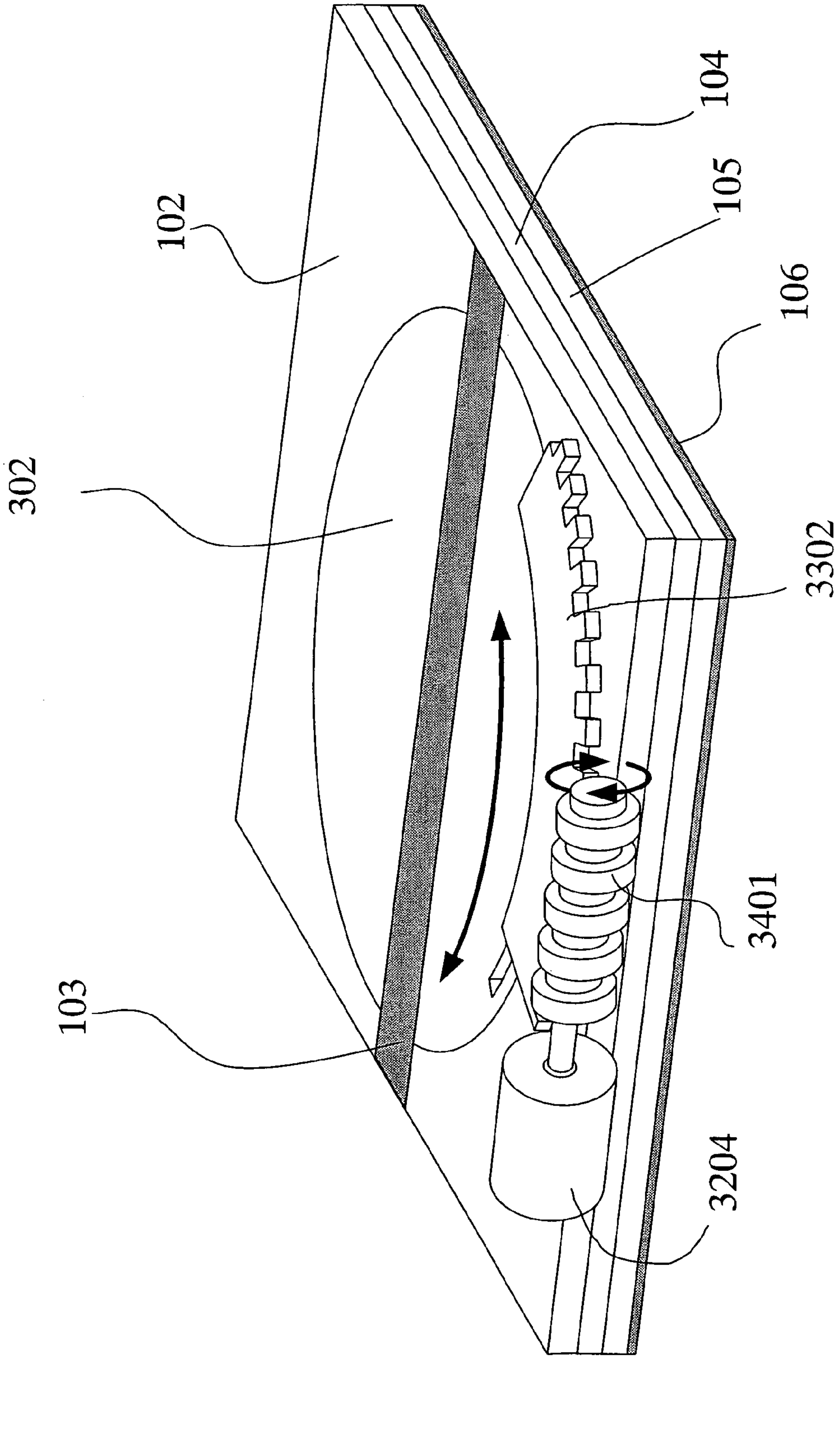
FIG. 15 is a perspective view illustrating a lattice turning mechanism according to a fifth preferred embodiment of the present invention.

Hereinafter, a fifth preferred embodiment of a photonic crystal device according to the present invention will be described with reference to FIG. 15, which illustrates still another embodiment of a photonic crystal device including a rotating mechanism that uses a motor as a power source. The configuration of this preferred embodiment is also the same as that of the photonic crystal device shown in FIG. 11 except the rotating mechanism. Thus, the following description will be focused on the rotating mechanism of this preferred embodiment.

In this preferred embodiment, a worm gear 3401 is connected to the output axis of the motor 3204 and engages with the large spur gear 3302. As having a huge axle ratio, such a mechanism can control the angle of rotation of the rotating lattice with high precision even if the precision of rotation of the motor 3204 is low. That is why an inexpensive motor such as a servo motor may also be used.

Figure 14:
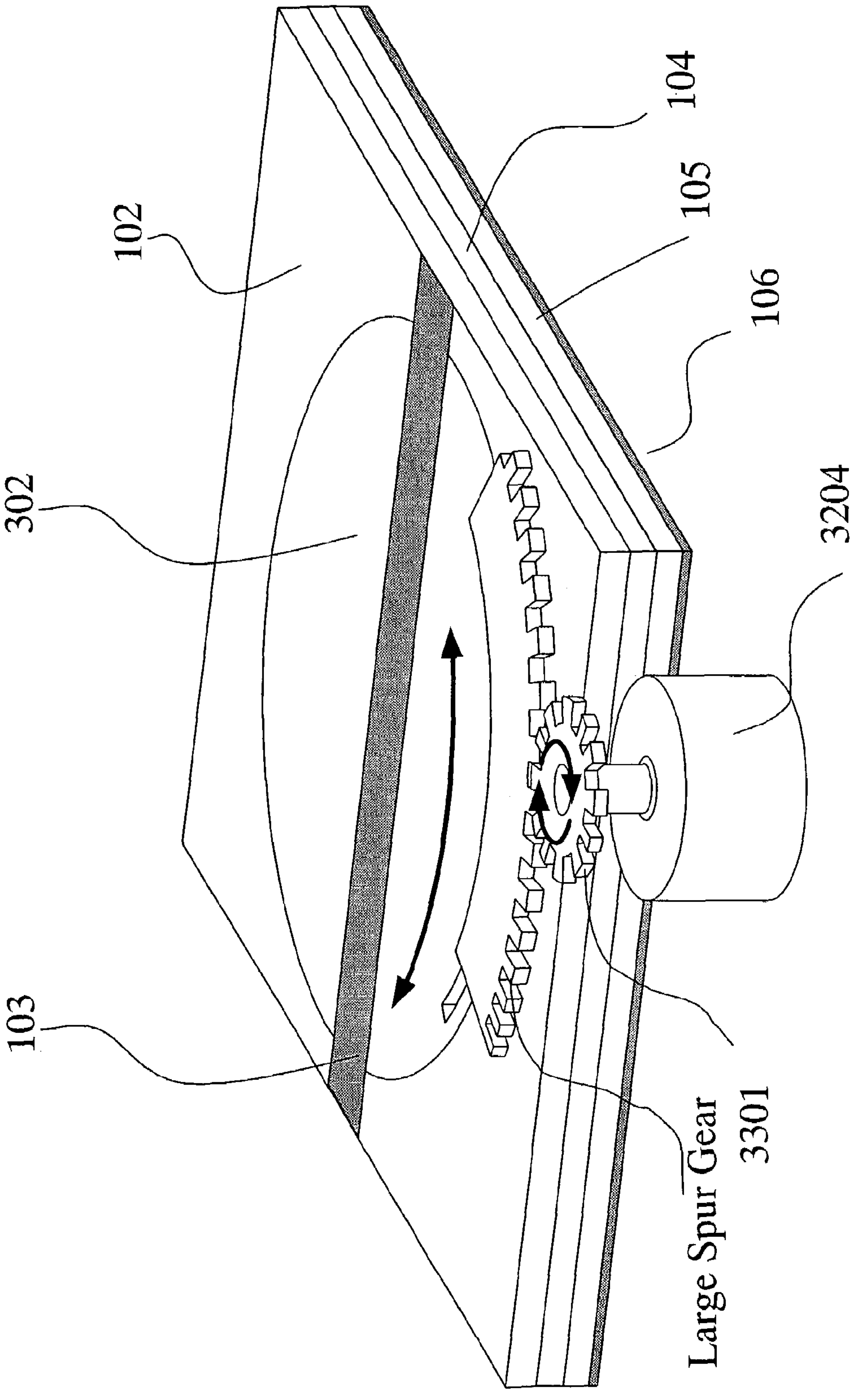
FIG. 14 is a perspective view illustrating a lattice turning mechanism according to a fourth preferred embodiment of the present invention.

According to this preferred embodiment, greater driving force can be applied to the rotating lattice 302 compared to the example shown in FIG. 13 or 14. The configuration of this preferred embodiment is effectively applicable to a situation where the rotating lattice 302 receives frictional force from another substrate.

Embodiment 6

Figure 16:
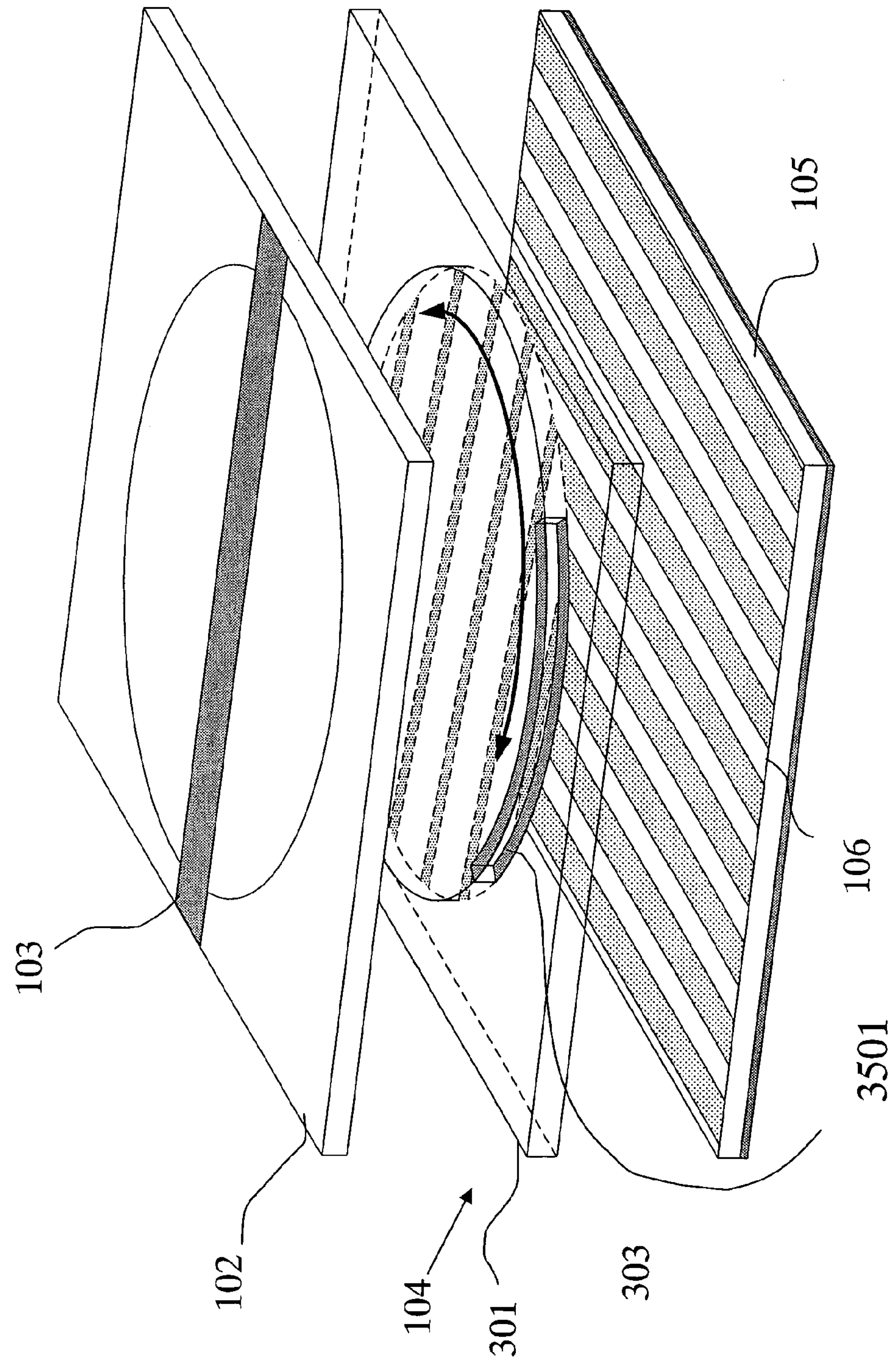
FIG. 16 is a perspective view illustrating a lattice turning mechanism according to a sixth preferred embodiment of the present invention.

Hereinafter, a sixth preferred embodiment of a photonic crystal device according to the present invention will be described with reference to FIG. 16, which illustrates yet another embodiment of a photonic crystal device including a rotating mechanism that uses a motor as a power source. The configuration of this preferred embodiment is also the same as that of the photonic crystal device shown in FIG. 11 except the rotating mechanism. Thus, the following description will be focused on the rotating mechanism of this preferred embodiment.

In this preferred embodiment, an ultrasonic motor 3501 made of an arced piezoelectric body is built in. The upper surface of the piezoelectric body in the ultrasonic motor 3501 is in contact with the lower surface of the circuit substrate 102. When an AC signal is applied to the piezoelectric body, a traveling wave for the flexure mode of the piezoelectric body is produced in the length direction of the piezoelectric body. And when this traveling wave is produced, driving force is generated in the opposite direction to the traveling direction of the traveling wave due to the frictional force produced between the upper surface of the piezoelectric body and the lower surface of the circuit substrate 102. The rotating lattice 302 can be turned by this driving force. According to this preferred embodiment, the number of necessary parts can be decreased.

Embodiment 7

Figure 17:
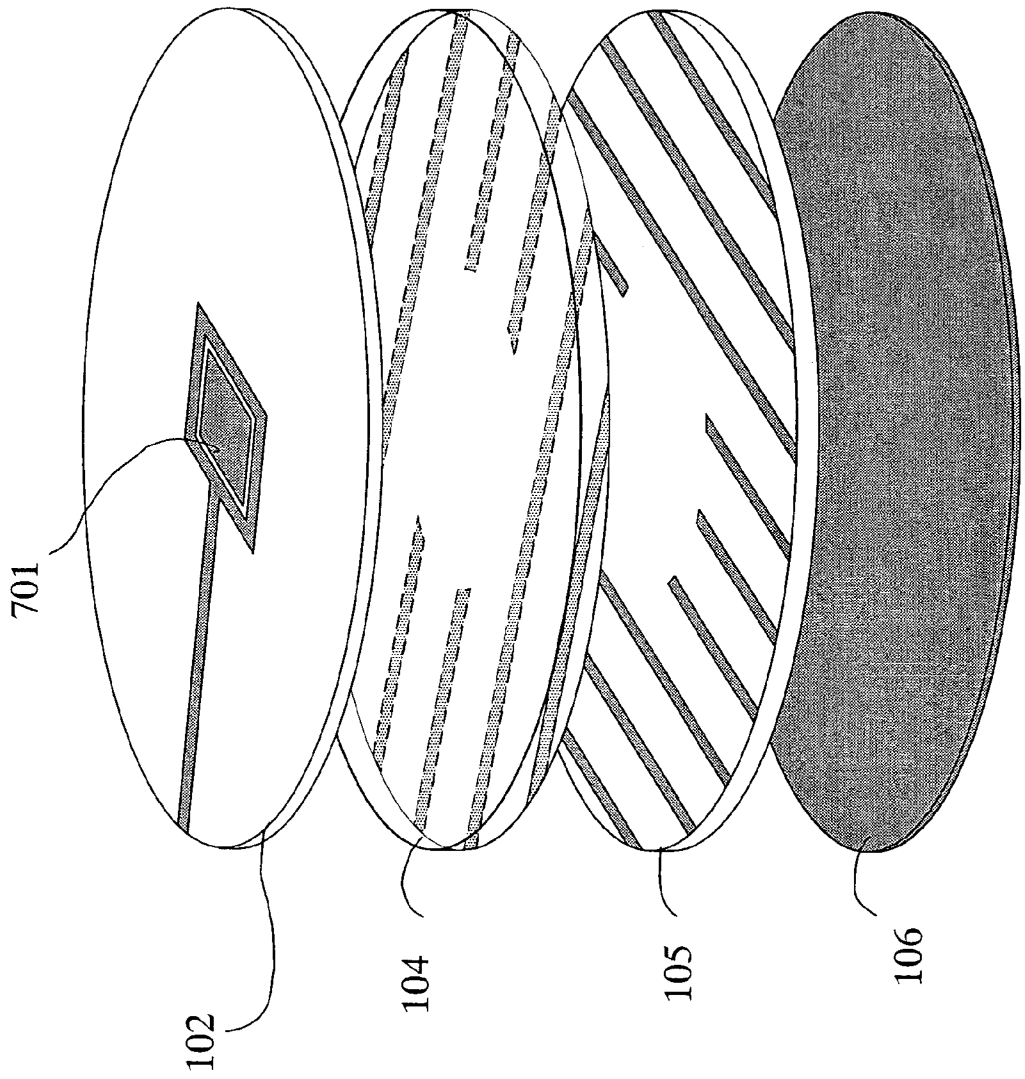
FIG. 17 is a perspective view illustrating a photonic crystal device according to a seventh preferred embodiment of the present invention.

Hereinafter, a seventh preferred embodiment of a photonic crystal device according to the present invention will be described with reference to FIG. 17, which illustrates a photonic crystal device of this preferred embodiment functioning as a microstrip antenna.

An antenna 701, which can radiate electromagnetic waves at multiple different frequencies and is connected to the end of a microstrip line, is provided for the circuit substrate of the photonic crystal device of this preferred embodiment.

As described above, an ordinary microstrip antenna has strong E-plane directivity parallel to the surface of a dielectric substrate. That is why the microstrip antenna easily causes leakage of electrical power and has low directivity. According to this preferred embodiment, however, the photonic crystal is arranged between the antenna 701 and the grounded plate, and therefore, the E-plane directivity parallel to the surface of the substrate can be reduced. Also, by defining the PBG in a range including the resonant frequency of the antenna 701, good communication performance is realized in every mode of operation.

Embodiment 8

Hereinafter, an eighth preferred embodiment of a photonic crystal device according to the present invention will be described with reference to FIG. 18, which illustrates a photonic crystal device of this preferred embodiment functioning as a variable band-elimination filter.

The photonic crystal device (small variable filter) 3604 of this preferred embodiment has the same configuration as that shown in FIG. 14. However, by inserting this device into a section of a known RF circuit, only a signal in any desired frequency band can be filtered out and attenuated.

In this preferred embodiment, a microelectromechanical system (MEMS) motor 3601 is used as a power source. The MEMS motor 3601 may be fabricated by a known semiconductor device processing technique. The area of a device that can produce a PBG in the millimeter wave band is at most 10 mm×10 mm. That is why a motor, of which the size has been reduced significantly by the MEMS technology, can be used effectively.

The small variable filter 3604 may be bonded onto a circuit board by a known surface mounting technique. Specifically, first, a motherboard 3603, having a recess or an opening of which the shape and dimensions are defined so as to accommodate the small variable filter 3604, is prepared. The thickness of the motherboard 3603 is preferably nearly equal to that of the small variable filter 3604. Then, the small variable filter 3604 is inserted into the recess or opening of the motherboard 3603. Thereafter, the grounded plate 106 of the small variable filter 3604 is electrically connected to the ground of the motherboard 3603 with solder or silver paste. Finally, the conductor line 103 of the small variable filter 3604 is connected to the signal line of the motherboard 3603 via bonding wires 3602.

Figure 18:
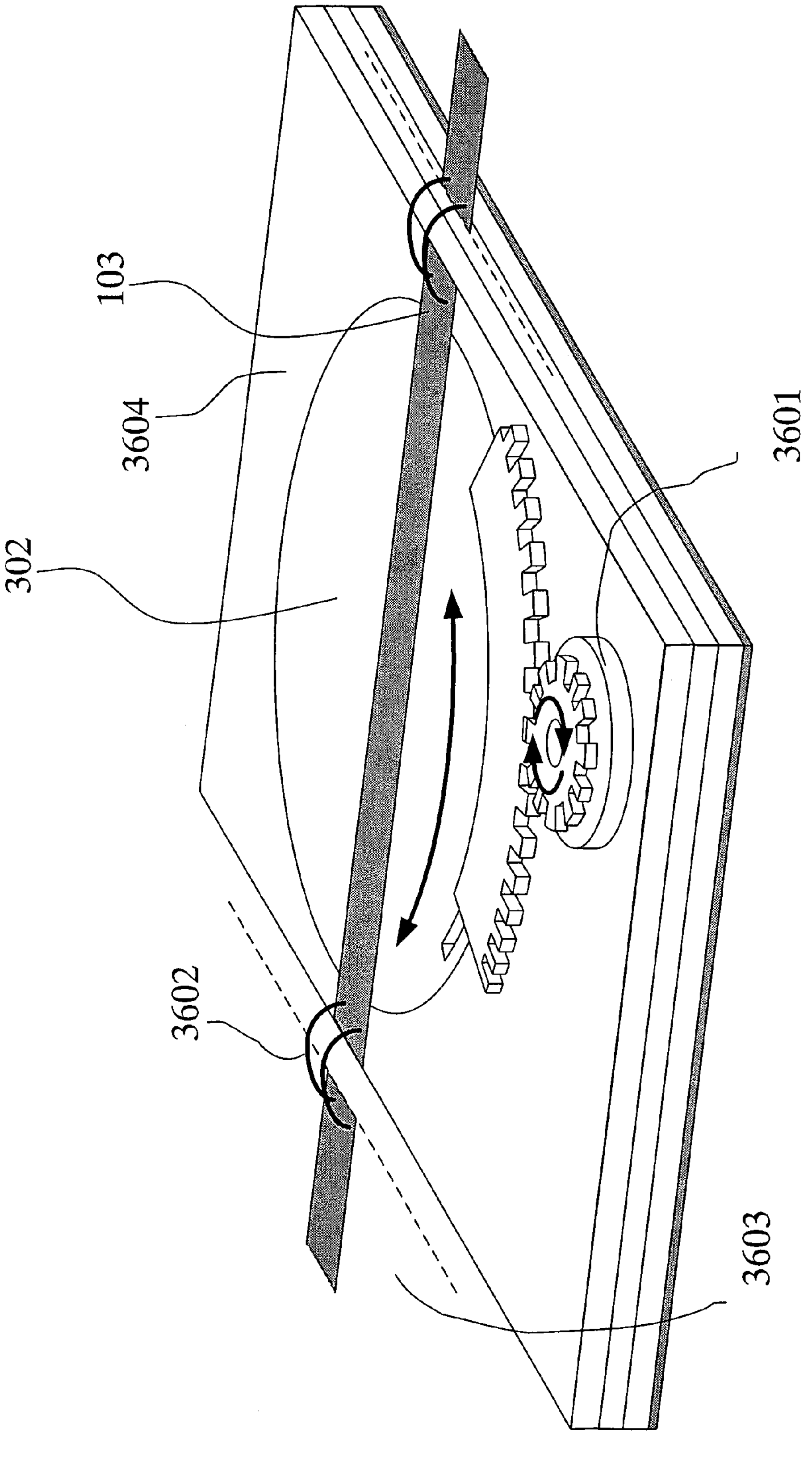
FIG. 18 is a perspective view illustrating a photonic crystal device according to an eighth preferred embodiment of the present invention.

In the example illustrated in FIG. 18, only the conductor line 103 is provided on the rotating lattice 302. However, other circuit components may be additionally provided on the rotating lattice 302. The present invention can be used in a variety of applications as long as an electromagnetic field generated by a signal propagating along a substrate acts on the stack of dielectric substrates functioning as a photonic crystal.

Embodiment 9

Figure 19:
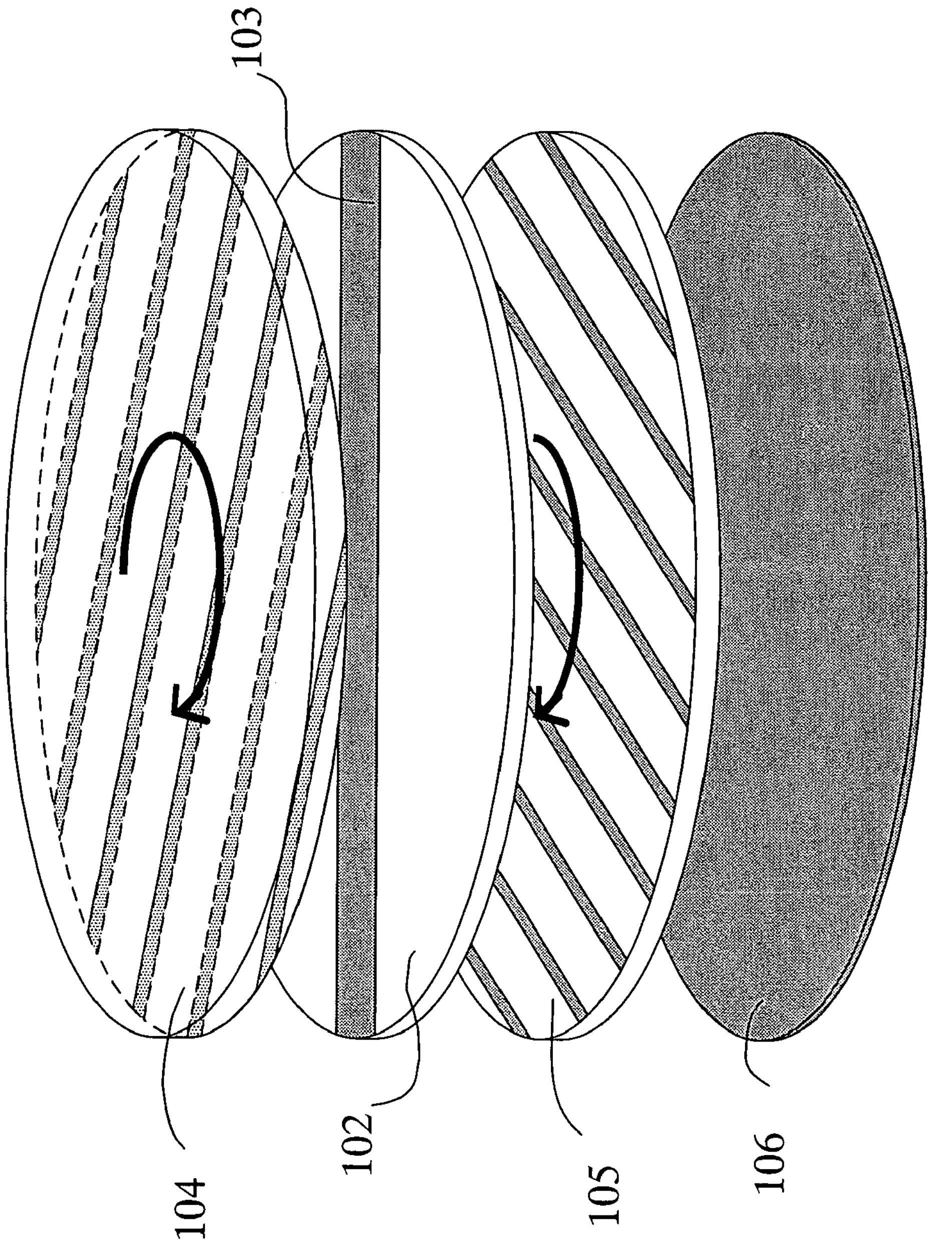
FIG. 19 is a perspective view illustrating a photonic crystal device according to a ninth preferred embodiment of the present invention.

A ninth preferred embodiment of a photonic crystal device according to the present invention will be described with reference to FIGS. 19 and 20. The photonic crystal device of this preferred embodiment and the counterpart shown in FIG. 1 have the same configuration except that the circuit substrate 102 is inserted between the first and second lattice substrates 104 and 105 in this preferred embodiment.

The RF signal guided through the conductor line 103 on the circuit substrate 102 generates electromagnetic fields not only under the conductor line 103 but also over the conductor line 103. Accordingly, the PBG can also be produced by arranging the pair of one-dimensional lattices 104 and 105 such that the circuit substrate 102 is sandwiched between the lattices 104 and 105 as shown in FIG. 19. The method and mechanism of changing the relative arrangement of the lattice substrates 104 and 105 may be just as described above.

Figure 20:
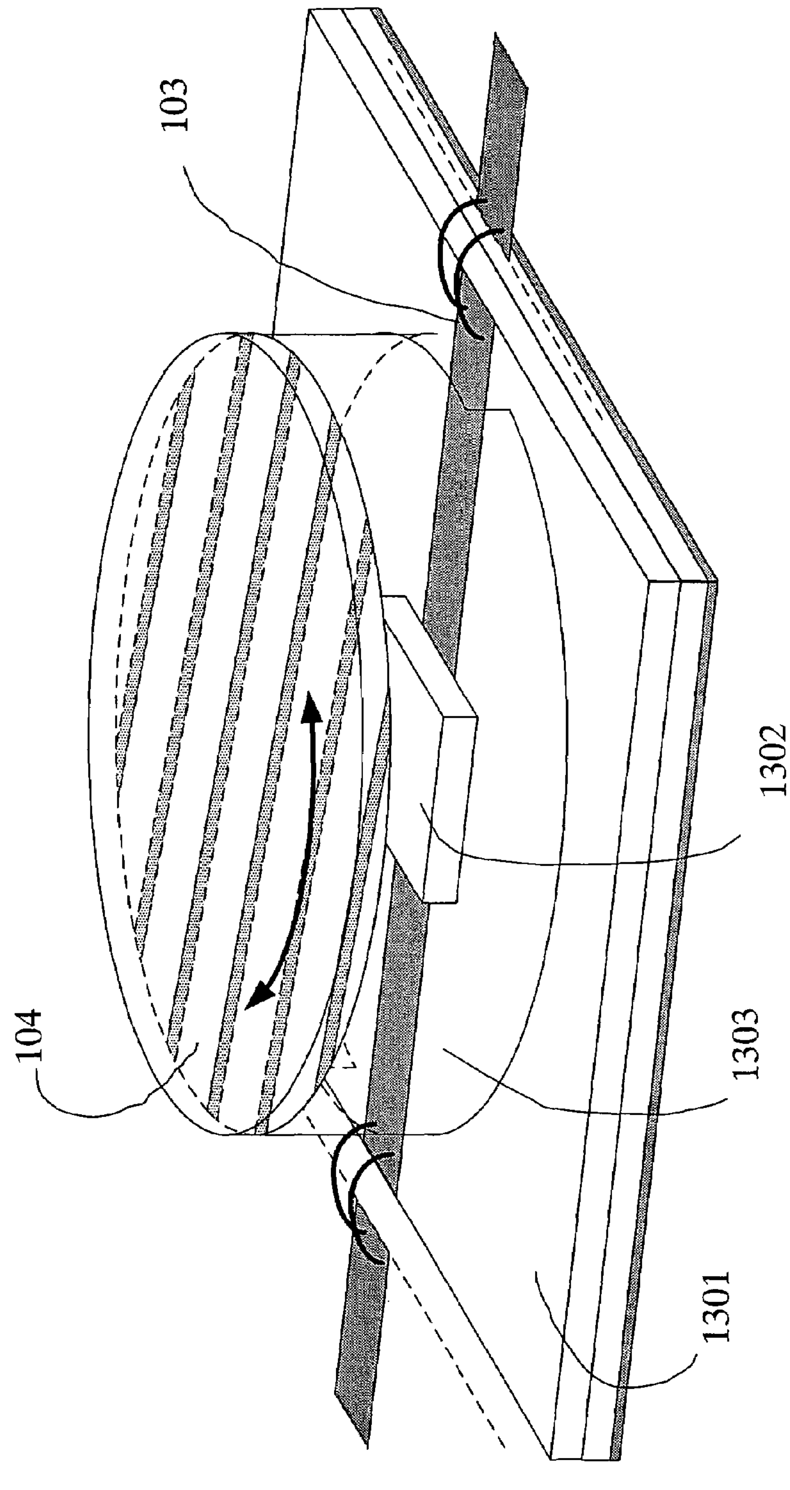
FIG. 20 is a perspective view illustrating a configuration for an apparatus including the photonic crystal device of the ninth preferred embodiment.

FIG. 20 illustrates a schematic configuration for this preferred embodiment.

The grounded plate 106, second lattice substrate 105 and circuit substrate 102 are stacked and fixed one upon the other, thereby forming a single small substrate 1301. A nonlinear element such as a millimeter wave IC 1302 is mounted on the small substrate 1301. Also, the conductor line 103 is connected to the input/output ports of the nonlinear circuit component so that an RF signal can be input to and output from the circuit component.

The millimeter wave IC 1302 may be an oscillator, an up-converter, a down-converter, a frequency synthesizer or an amplifier, for example. The number of the input/output ports changes with the type of the element. FIG. 20 illustrates an example in which just two input/output ports are provided for the sake of simplicity.

The small substrate 1301 may be mounted on a motherboard just as already described with reference to FIG. 18. A cap 1303 is provided on the small substrate 1301 so as to cover the millimeter wave IC 1302. The cap 1303 includes a disklike top portion and a cylindrical sidewall portion that supports the top portion in a rotatable position. The first lattice substrate 104 is fixed on the back surface of the top portion of the cap 1303 such that the lattice pattern faces the conductor line 103.

In the millimeter wave band, the difference in the performance of nonlinear elements of the same type is significant from one product to another. More particularly, the output level and the frequency range of an unwanted signal generated by the nonlinear element change on a product-by-product basis. For that reason, a radio wave absorber is usually attached to the back surface of the cap 1303 to remove the unnecessary waves. In that case, however, trails and errors are inevitable to determine how much radio wave absorber should be attached to where by taking individual differences into account. As a result, the manufacturing cost rises unintentionally.

According to this preferred embodiment, however, the first lattice substrate 104 can be turned and the PBG appearance frequency band can be adjusted even after the nonlinear element has been mounted on the small substrate and encapsulated with a metallic cap. As a result, the output of unnecessary components from the device can be minimized appropriately. Such fine adjustment can also be made even after the small substrate 1301 has been bonded onto a motherboard.

The first lattice substrate 104 may be driven either manually or by a motor.

Figure 21:
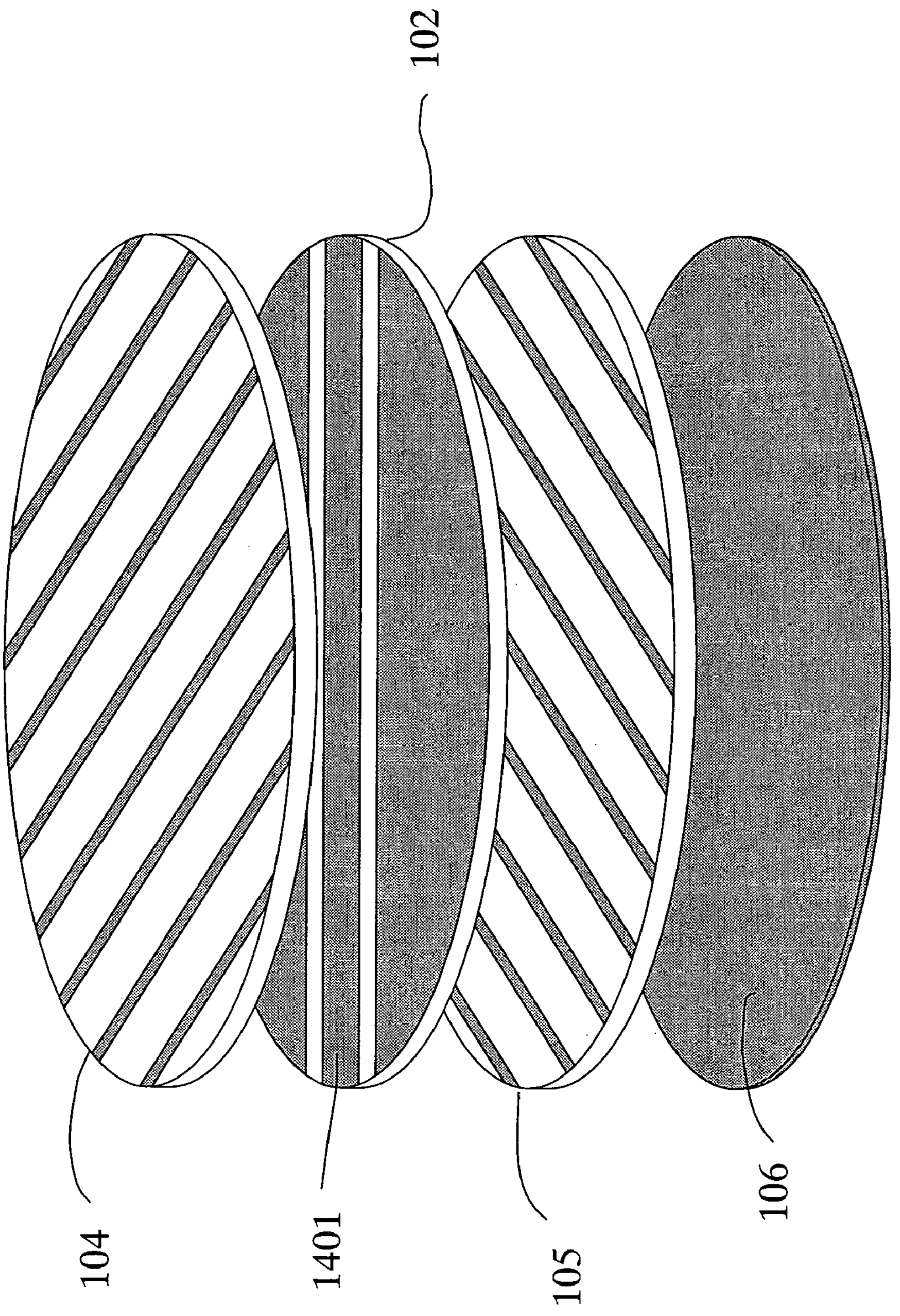
FIG. 21 is a perspective view illustrating a modified example of the photonic crystal device of the ninth preferred embodiment.
Figure 22:
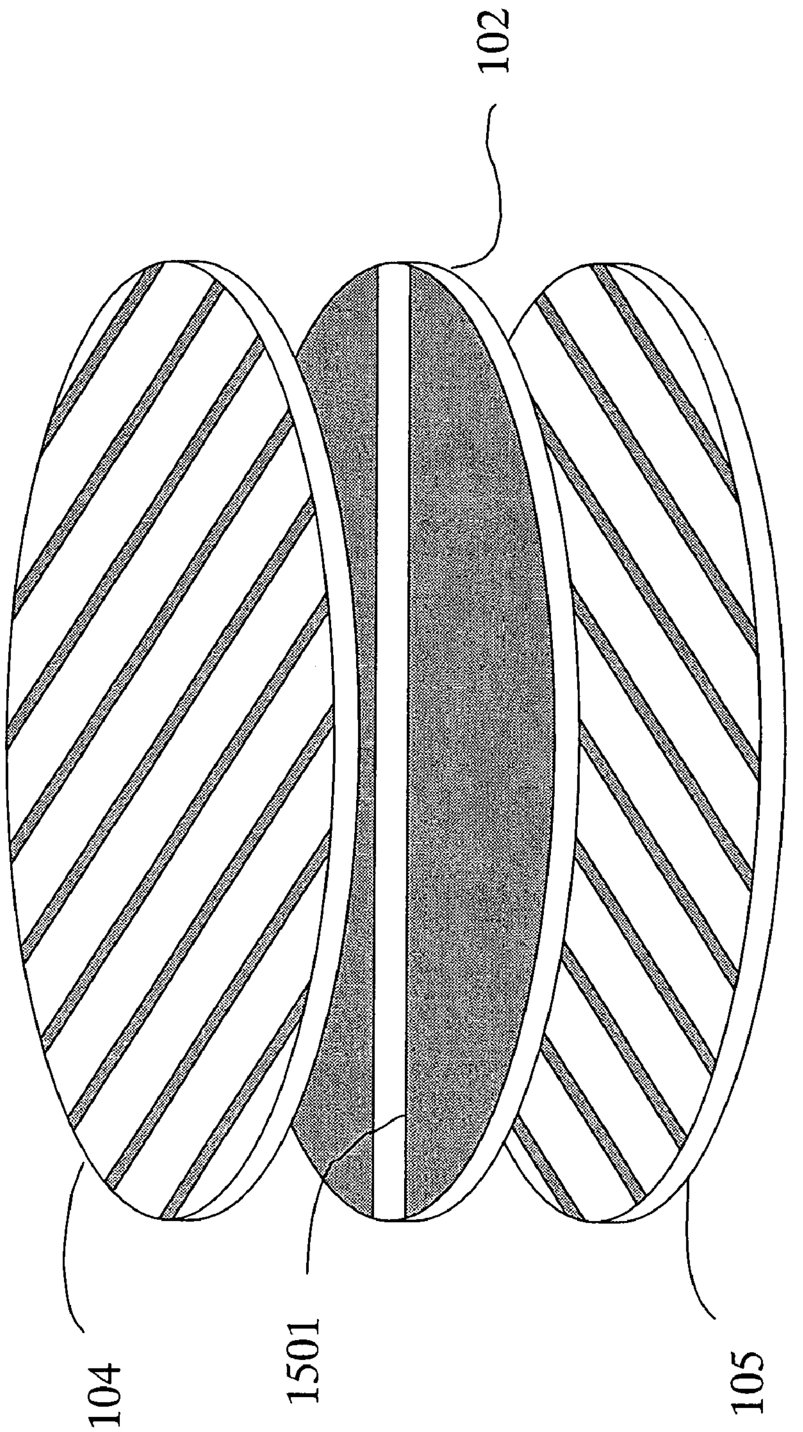
FIG. 22 is a perspective view illustrating another modified example of the photonic crystal device of the ninth preferred embodiment.

In this preferred embodiment, the conductor line 103 and grounded plate 106 together form a microstrip line. Alternatively, a coplanar line 1401 may also be used as shown in FIG. 21. If the coplanar line 1401 is used as a grounded coplanar line, then the grounded plate 106 is required. However, if the coplanar line 1401 is used as a normal coplanar line, the grounded plate 106 may be omitted. FIG. 22 illustrates a slot line, which does not need any grounded plate 106, either.

Embodiment 10

Hereinafter, a tenth preferred embodiment of a photonic crystal device according to the present invention will be described with reference to FIG. 23. The circuit substrate has no one-dimensional lattice in any of the preferred embodiments described above. However, in this preferred embodiment, not only the conductor line but also a one-dimensional lattice are arranged on the circuit substrate. In other words, the conductor line is provided on one of the first and second dielectric substrates, which is made to function as a "circuit substrate", too. Also, in this preferred embodiment, such a circuit substrate (which is a dielectric substrate including both a lattice structure and the conductor line) is arranged close to another dielectric substrate with a different lattice structure, thereby defining the photonic crystal structure.

Generally speaking, when an RF signal propagates along a conductor line on a circuit substrate, the electromagnetic field, generated by the RF signal, is localized to the vicinity of the conductor line. For that reason, if the lattice structure were located far away from the conductor line, then the effects of the photonic crystal, defining the propagation characteristic of the RF signal, would decrease. Likewise, even when a millimeter wave IC is provided on a circuit substrate, the electromagnetic field tends to have a localized distribution, too. In that case, the propagation characteristic of the RF signal is preferably controlled by defining the photonic crystal structure in or near the region where the electromagnetic field has the localized distribution.

Figure 23:
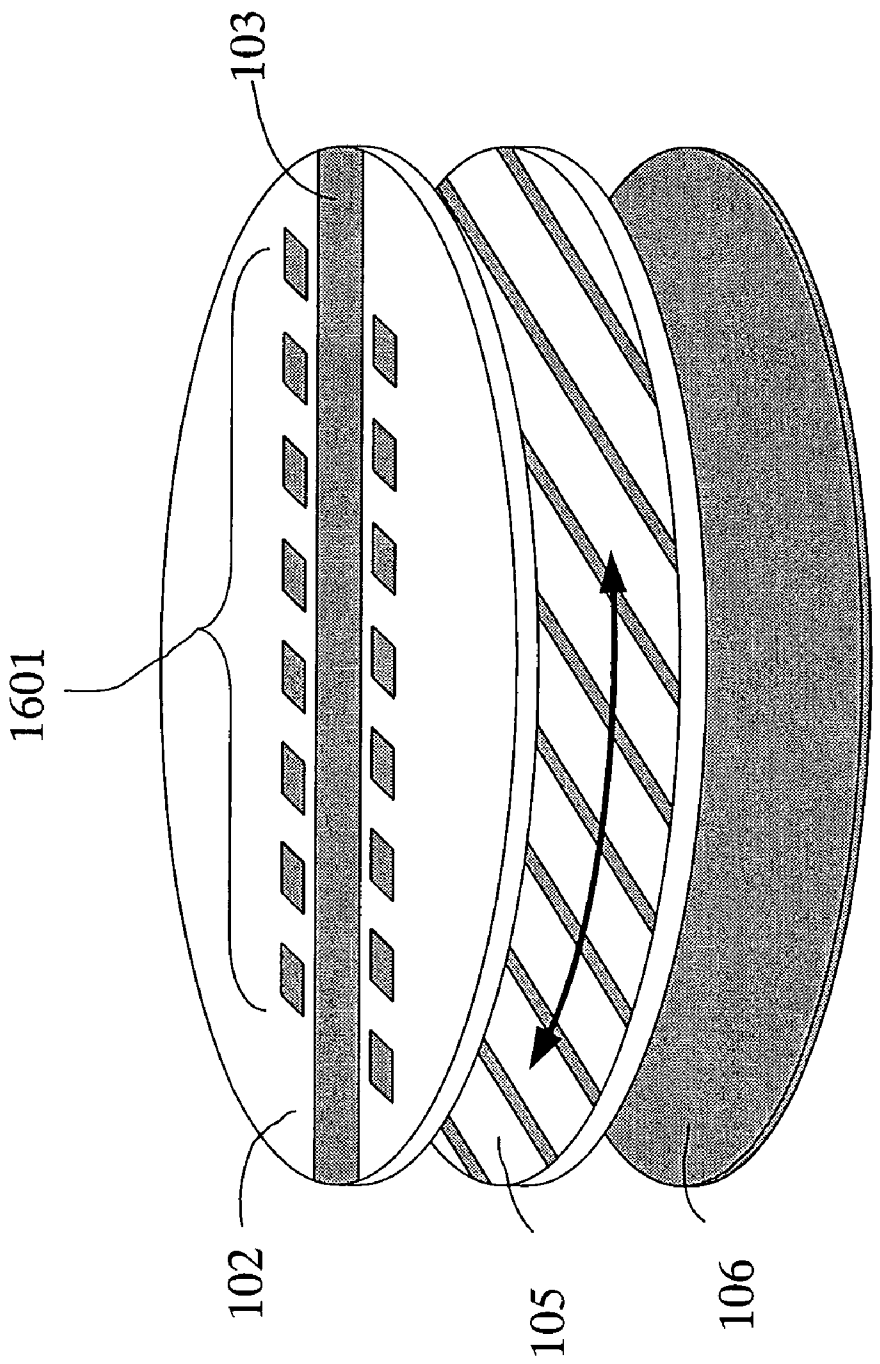
FIG. 23 is a perspective view illustrating a photonic crystal device according to a tenth preferred embodiment of the present invention.

In this preferred embodiment, a one-dimensional lattice structure 1601 is provided near the conductor line 103 on the circuit substrate 102 as shown in FIG. 23 such that the circuit substrate 102 functions as the first lattice substrate 104, too. The one-dimensional lattice structure 1601 preferably consists of pattern elements of a conductor layer, which are arranged periodically at an interval that is approximately equal to a half of the wavelength of the RF signal.

A second lattice substrate (i.e., second dielectric substrate) 105 is rotatably supported between the circuit substrate 102 and the grounded plate 106. The second lattice substrate 105 of this preferred embodiment has the same configuration as the counterpart of any of the other preferred embodiments described above.

By rotating such a second lattice substrate 105 with respect to the circuit substrate 102, the photonic crystal structure, defined by the lattice structure (i.e., the striped conductor line) of the second lattice substrate 105 and the one-dimensional lattice structure 1601 of the circuit substrate 102, can be changed. As a result, the PBG appearance frequency band can be changed and the propagation characteristic of the RF signal can be controlled appropriately.

In this preferred embodiment, rectangular conductors are arranged periodically near the conductor line 103 as shown in FIG. 23. However, the conductors to be arranged do not have to be rectangular but may also have any other arbitrary shape. The PBG appearance frequency band depends on the shape and arrangement period of the conductors to be arranged. That is why the shape of the conductors to be arranged is optimized according to the PBG appearance frequency band.

Besides, the unit structures to be arranged along the conductor line 103 do not have to be conductors, either. The point is a lattice structure, of which the effective dielectric constant changes periodically, should be provided along the conductor line 103.

Figure 24C:
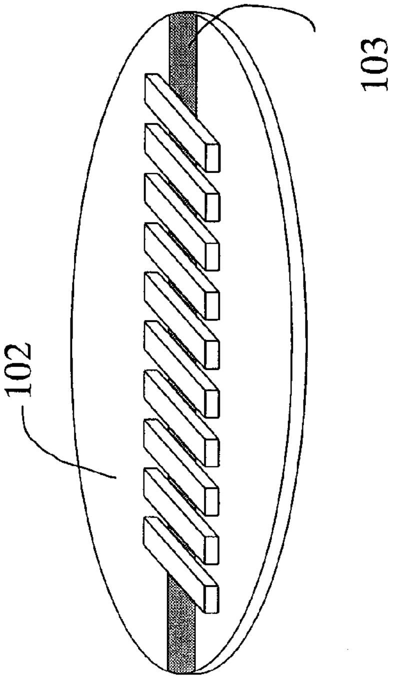
FIGS. 24A, 24B and 24C are perspective views illustrating various examples of circuit substrates according to the tenth preferred embodiment.
Figure 24A:
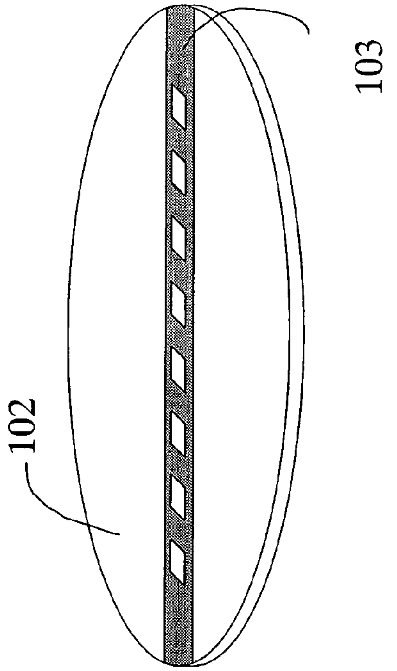
Figure 24B:
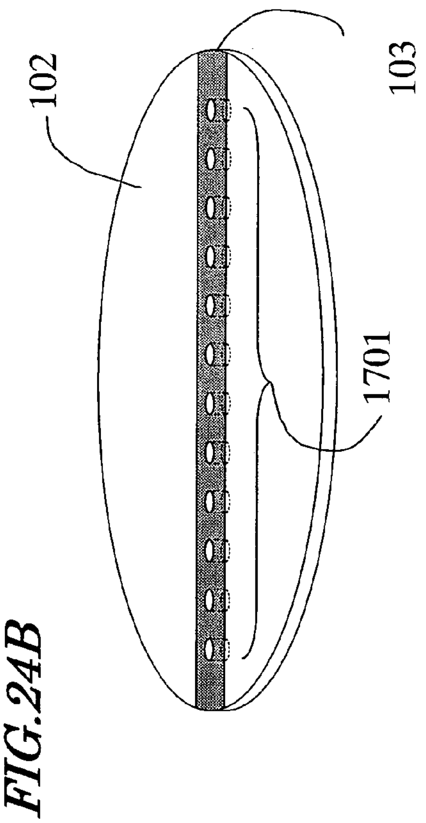

FIGS. 24A through 24C illustrate examples in which some periodic structure is provided on or near the conductor line 103. Specifically, in FIG. 24A, the conductor line 103 has a periodic arrangement of openings. In FIG. 24B, a periodic arrangement of via holes 1701 is provided under the conductor line 103. In the example illustrated in FIG. 24B, circular openings are cut periodically through the conductor line 103. However, it is not always necessary to cut such openings through the conductor line 103. A lattice structure can also be formed just by arranging via holes 1701 in the vicinity of the conductor line 103. In the example illustrated in FIG. 24C, pieces of a dielectric material are arranged periodically on the conductor line 103.

Figure 25A:
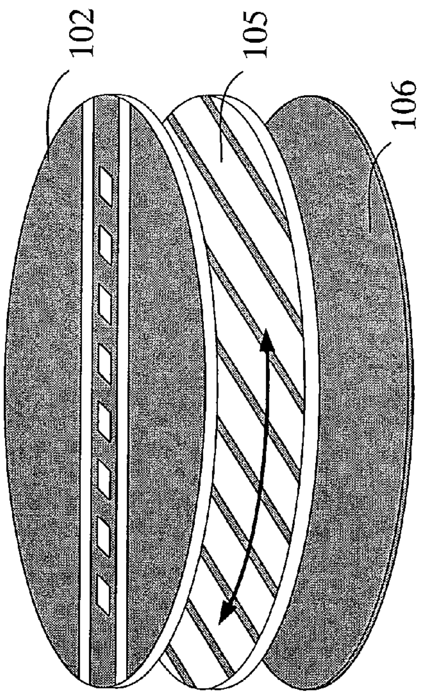
FIGS. 25A, 25B, 25C and 25D are perspective views illustrating modified examples of the photonic crystal device of the tenth preferred embodiment.
Figure 25B:
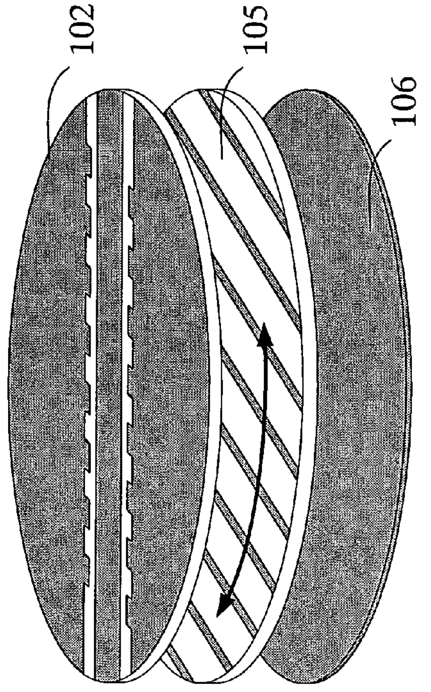
Figure 25C:
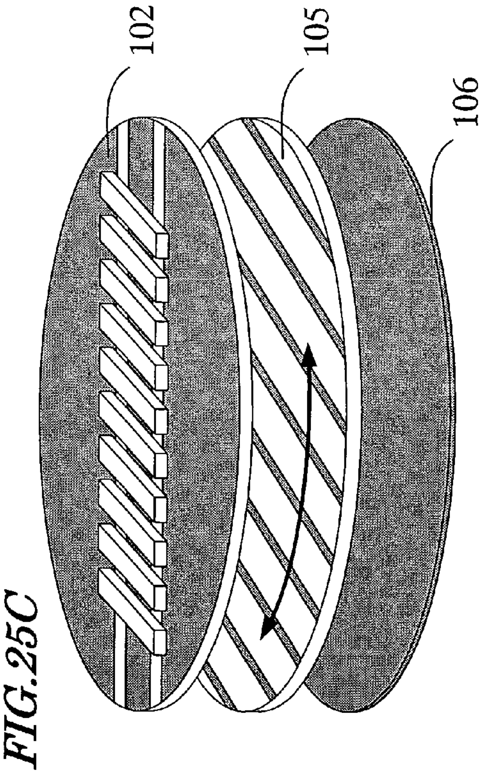
Figure 25D:
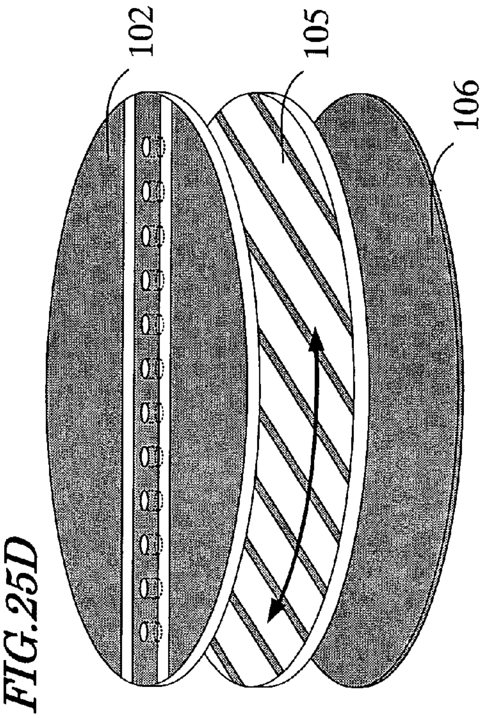

FIGS. 25A through 25D illustrate examples in which a one-dimensional lattice structure is provided along coplanar lines. In FIGS. 25A through 25D, the dark areas show portions with electrical conductivity. Specifically, in the example illustrated in FIG. 25A, a periodic structure is defined by central conductors that are arranged between the coplanar lines. FIG. 25B illustrates an example in which a periodic structure is provided outside of the lines. In FIG. 25C, a periodic structure of a dielectric material is provided on the lines. And in the example illustrated in FIG. 25D, a periodic arrangement of via holes is provided under the central conductors that are arranged between the lines. However, the via holes do not have to be arranged under the central conductors between the lines but may also be provided under the conductors that are arranged outside of the lines.

If these coplanar lines are made to operate as grounded coplanar lines, the grounded plate 106 is needed. However, if these coplanar lines may operate as normal coplanar lines, no grounded plate 106 is needed.

Figure 26A:
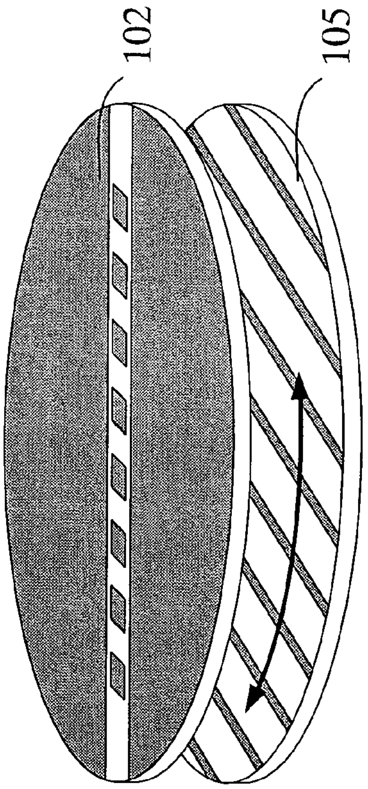
FIGS. 26A, 26B, 26C and 26D are perspective views illustrating other modified examples of the photonic crystal device of the tenth preferred embodiment.
Figure 26B:
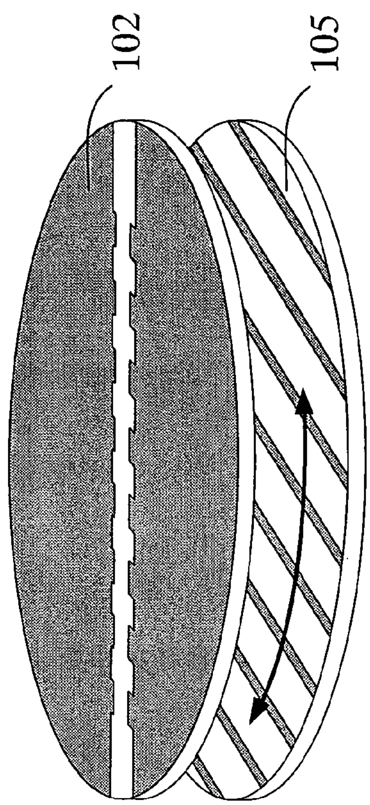
Figure 26C:
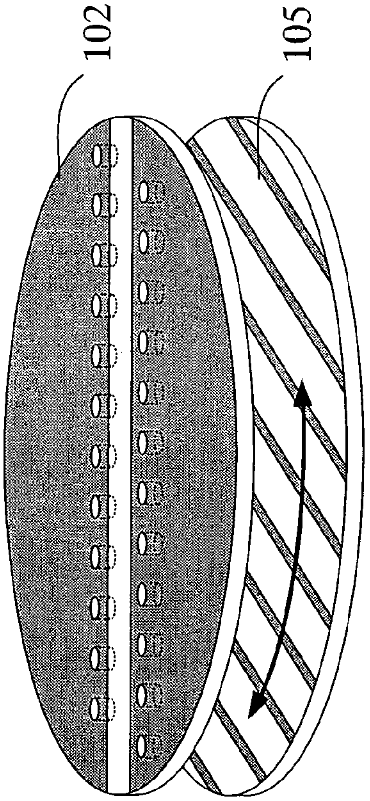
Figure 26D:
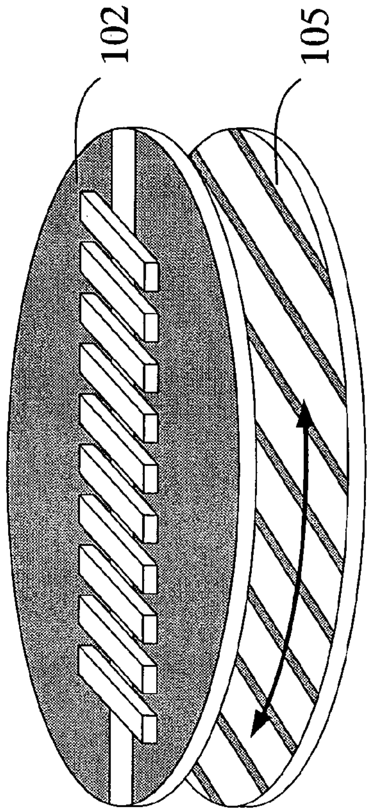

FIGS. 26A through 26D illustrate examples in which a one-dimensional lattice structure is provided along a slot line. In the example illustrated in FIG. 26A, conductors are arranged periodically in the slot. FIG. 26B illustrates an example in which a periodic structure is provided at the edges of the conductor that define the ends of the slot. In FIG. 26C, a periodic arrangement of via holes is provided. And in the example illustrated in FIG. 26D, a periodic arrangement of a dielectric material is provided over the slot.

Figure 27:
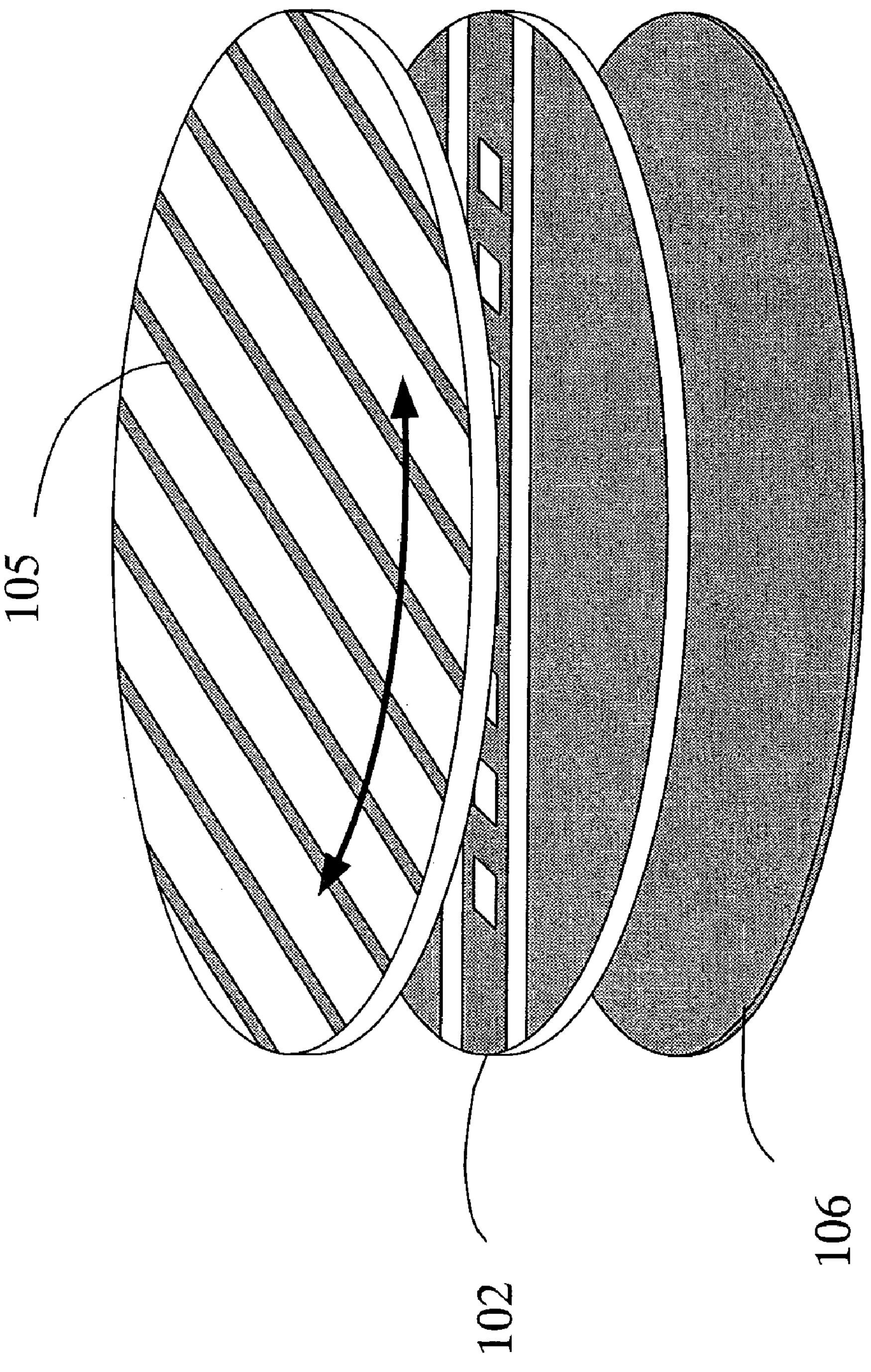
FIG. 27 is a perspective view illustrating still another modified example of the photonic crystal device of the tenth preferred embodiment.
Figure 28:
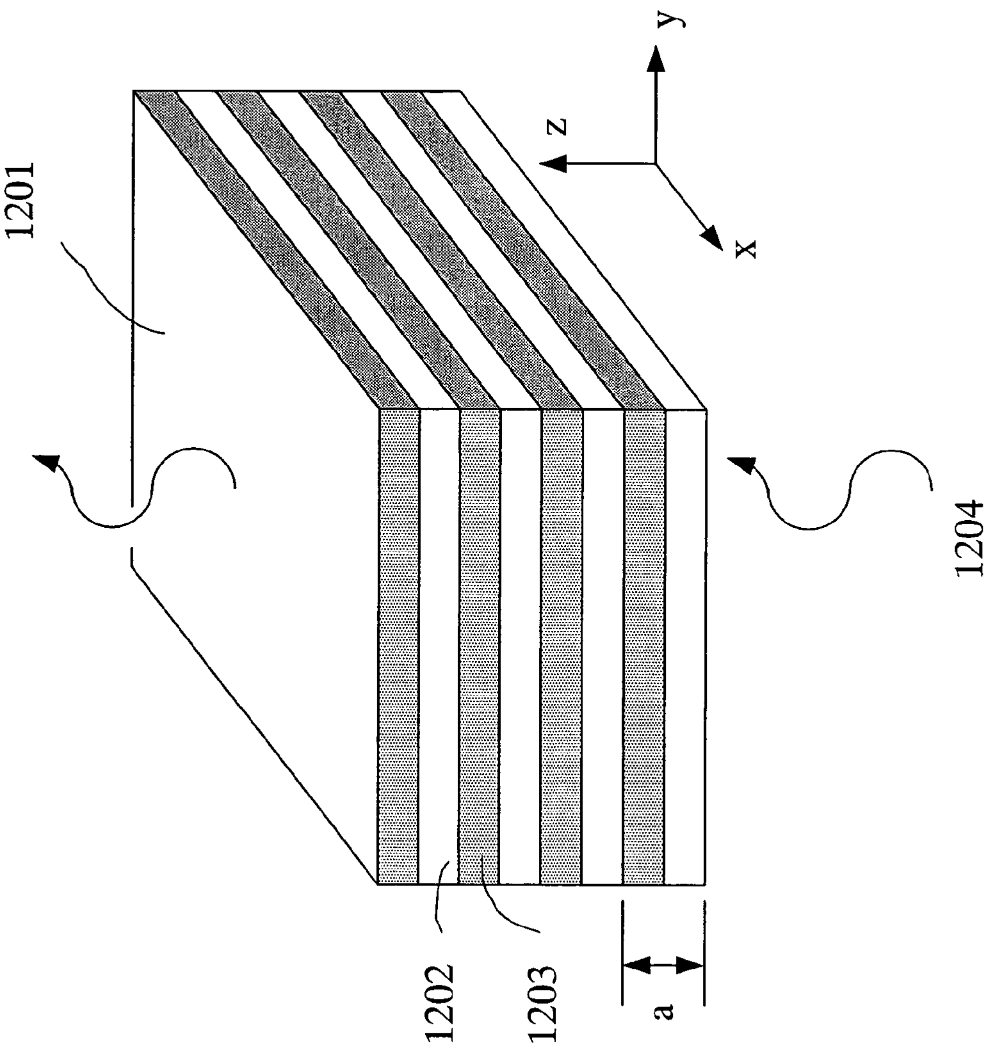
FIG. 28 is a perspective view illustrating conventional one-dimensional photonic crystals.

In these preferred embodiments, the one-dimensional lattice substrate 105 is provided so as to face the other side of the circuit substrate 102 on which no conductor pattern is provided (i.e., so as to be opposed to the lower surface of the circuit substrate 102). Alternatively, the one-dimensional lattice substrate 105 may also be provided so as to face the side of the circuit substrate 102 with the conductor pattern (i.e., so as to be opposed to the upper surface of the circuit substrate 102) as shown in FIG. 27.

In the preferred embodiments described above, by moving at least one of the first and second lattice substrates 104 and 105, the photonic crystal structure is changed and the PBG frequency band is controlled. However, the photonic crystal device of the present invention may also operate as follows.

Specifically, the circuit substrate 102, first lattice substrate 104 and second lattice substrate 105 may be arranged such that the photonic crystal device is selectively turned ON and OFF by either moving at least one of these substrates far away from the other substrates (which defines the OFF state) or bringing it close to the other substrates (which defines the ON state). Then, the photonic crystal device can be switched between a state with no PBG and a state with the PBG.

As used herein, the "adjustment device" may be any mechanism for changing the positions, directions, tilt angles and other parameters of the dielectric substrates so as to change the photonic crystal structure defined by the two lattice structures. Thus, the specific structure of the "adjustment device" is not limited to those disclosed in this description.

A photonic crystal device according to the present invention can change the frequencies of the photonic bandgap (PBG) and can be used effectively as a variable filter in the field of RF circuits, for example.

What is claimed is:

1. A photonic crystal device comprising:

a first dielectric substrate having a first striped structure, of which the dielectric constant changes periodically within a first plane;

a second dielectric substrate having a second striped structure, of which the dielectric constant changes periodically within a second plane; and an adjustment device for changing a photonic band structure, defined by the first and second striped structures, by varying relative arrangement of the first and second striped structures, wherein the first and second dielectric substrates are stacked one upon the other, and wherein the adjustment device rotates at least one of the first and second dielectric substrates, and wherein the substrate driven by the adjustment device turns around a z-axis that passes the center of the substrate, and wherein the first and second dielectric substrates are both parallel to an xy plane that is perpendicular to the z-axis, and wherein in a transparent plan view, a lattice pattern formed by the first and second striped structures is varied by the adjustment device.

2. The photonic crystal device of claim 1, further comprising a third dielectric substrate, which is arranged so as to face at least one of the first and second dielectric substrates.

3. The photonic crystal device of claim 2, wherein the third dielectric substrate includes a dielectric layer and a conductor pattern supported on the dielectric layer.

4. The photonic crystal device of claim 3, further comprising a grounded conductor layer, wherein at least one of the first and second dielectric substrates is located between the third dielectric substrate and the grounded conductor layer.

5. The photonic crystal device of claim 4, wherein at least a portion of the conductor pattern functions as a microstrip line.

6. The photonic crystal device of claim 4, wherein at least a portion of the conductor pattern functions as a microstrip antenna.

7. The photonic crystal device of claim 4, wherein the adjustment device rotates the third dielectric substrate.

8. The photonic crystal device of claim 7, wherein the dielectric substrate to be turned by the adjustment device has a disk shape.

9. The photonic crystal device of claim 1, wherein the dielectric substrate to be turned by the adjustment device has a disk shape.

10. The photonic crystal device of claim 1, wherein the adjustment device includes a motor.

11. The photonic crystal device of claim 1, wherein the first and second striped structures are defined by conductor patterns that have been made on the first and second dielectric substrates, respectively.

12. The photonic crystal device of claim 1, wherein the first and second striped structures are defined by rugged patterns that have been made on the first and second dielectric substrates, respectively.

13. The photonic crystal device of claim 1, wherein each of the first and second striped structures is a one-dimensional lattice.

14. The photonic crystal device of claim 13, wherein each of the first and second striped structures includes a curved pattern within the plane thereof.

15. The photonic crystal device of claim 1, wherein each of the first and second striped structures is a combination of multiple one-dimensional lattices that are arranged in mutually different directions.

16. The photonic crystal device of claim 1, wherein the first and second dielectric substrates have different striped structures from one area of their planes to another.

17. The photonic crystal device of claim 1, wherein at least one of the first and second dielectric substrates has a conductor line for propagating an electromagnetic wave.

* * * * *